(12) United States Patent
O'Donnell

(10) Patent No.: US 7,313,465 B1
(45) Date of Patent: Dec. 25, 2007

(54) SYSTEM AND METHOD FOR MANAGING ENERGY GENERATION EQUIPMENT

(75) Inventor: John O'Donnell, South Lyon, MI (US)

(73) Assignee: DTE Energy Technologies, Inc., Farmington Hills, MI (US)

( * ) Notice: Subject to any disclaimer, the term of this patent is extended or adjusted under 35 U.S.C. 154(b) by 336 days.

(21) Appl. No.: 10/808,227

(22) Filed: Mar. 24, 2004

Related U.S. Application Data

(60) Provisional application No. 60/502,092, filed on Sep. 11, 2003.

(51) Int. Cl.
*G05D 11/00* (2006.01)

(52) U.S. Cl. ............... 700/291; 700/286; 323/237

(58) Field of Classification Search ........... 700/23, 700/286, 291; 62/148; 323/237, 268
See application file for complete search history.

(56) References Cited

U.S. PATENT DOCUMENTS 6,701,727 B2 * 3/2004 Komatsu et al. ............ 62/148

\* cited by examiner

*Primary Examiner*—Leo Picard
*Assistant Examiner*—Sheela Rao
(74) *Attorney, Agent, or Firm*—Williams Mullen, P.C.; Thomas F. Bergert

(57) ABSTRACT

A system and method for controlling distributed generation equipment based on remotely derived dispatch schemes improves economics and reliability of operation. The system can adapt to variable changing conditions in real-time to provide adaptable, real-time, site-specific load forecasting. The present invention can include one or more local site controller component(s) for receiving dispatch instructions and comparing the instructions to local information to further optimize operating instructions.

13 Claims, 19 Drawing Sheets

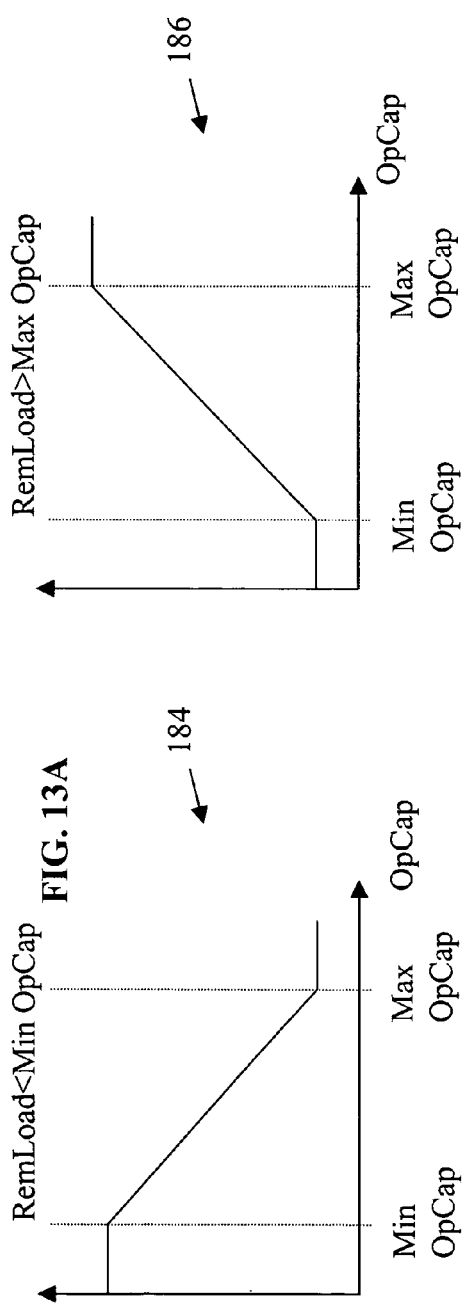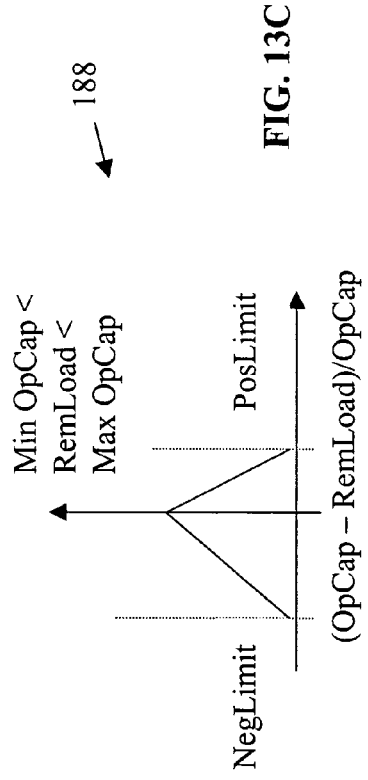
FIG. 13A
FIG. 13B
FIG. 13C

SYSTEM AND METHOD FOR MANAGING ENERGY GENERATION EQUIPMENT

CROSS REFERENCE TO RELATED APPLICATIONS

This application claims the benefit of U.S. application No. 60/502,092, filed Sep. 11, 2003, entitled "System and Method for the Cost Effective and Reliable Operation of Electrical Generation Equipment".

FIELD OF THE INVENTION

The present invention relates to distributed generation, and more particularly to a system and method for managing distributed generation equipment.

BACKGROUND ART

Commercial, residential and industrial facilities are becoming more versatile in managing their energy needs. Traditionally, nearly all energy consumers purchased power from a regulated utility, with few maintaining on-site generation for emergency backup. Now, some facilities are using on-site generation as primary power and other facilities are even selling locally-generated power back to the grid. Part of the reason for the change can be attributed to deregulation of the energy industry and the now widespread availability of distributed generation equipment.

Distributed generation equipment (DGE) refers to one of various power generation technologies which can be used on-site at a facility for various purposes, such as powering electrical equipment and heating and cooling systems, for example. Some DGE generate excess heat, which can be used in building or industrial processes, such as heating domestic hot water. A facility using DGE can be as large as an industrial complex or as small as a private residence. DGE is typically used alongside or in place of standard "grid" power provided by a utility or private enterprise.

DGE technologies include microturbines, fuel cells, internal and external combustion engines, reciprocating engines, photovoltaic cells, microgrids and other generation and storage types. DGE typically supplies both electrical energy and heat. Some DGE use essentially free fuels like sunlight or landfill gas while others use natural gas, propane or hydrogen. The fuel type can help determine operational parameters for DGE. For example, free fuel burning DGE might be operated at maximum power level whenever the fuel is available and the load can use the power, while DGE using other fuel types may only be run when it is most economical. Of course, specific circumstances may dictate different operating conditions regardless of fuel type.

Determining when to operate each DGE within a distributed generation environment and at what power level can be a rather complex decision, affected by the cost of fuel, the cost of the electric power or heat that is deferred, and, in some cases, the impact of the emissions both from the DGE device and from the central generator, for example. Such determination must also take into account that the demands for electric power and heat may not occur at the same time. In addition, there may be other services that the DGE can provide, such as, for example, voltage regulation, standby power, and ride through for voltage sags from the utility. In optimizing the economics of a given installation, operational decisions are directed not only by local power needs, heat and back up power supply, but also by the opportunities provided by the open market.

Various intelligent or expert system designs can be employed to assist in solving power system management problems. An expert system is an artificial intelligence application that uses a knowledge base of human expertise to aid in solving problems. It can use a software program as an interface with the user and then use the data in the knowledge base to process the results. Such intelligent systems can assist in a variety of power system applications, such as economic load dispatch, optimization and loss reduction, fault detection and diagnosis, load forecasting, power system planning, control and analysis, and even security assessment. Some of these applications influence others. For example, electrical load forecasting is very important for power system operators and planners, since many important functions in power system operational planning, such as unit commitment, economic dispatch, maintenance scheduling, and expansion planning are usually performed based on the forecasted loads.

Economic load dispatch, optimization and loss reduction involves managing the operation (dispatching) of generation and transmission facilities to produce the most cost-effective result. Economic dispatch most commonly involves the selection of the lowest-cost available generating units or fuels for powering available units. Fault detection and diagnosis involves managing the system to detect faults more quickly so as to properly restore operation as soon as possible.

Traditional intelligent systems for determining load forecasting have involved off-line processing of vast amounts of data using standard linear regression or neural network modeling. The resulting forecasting models are then used in real-time, focusing largely on aggregate loads and not site-specific loads. Such methods suffer from several disadvantages, including the inability to adapt the forecasting model to changing operational conditions in real time, especially on a site-specific basis.

Beyond neural networks, other expert systems can be employed to assist in solving power management problems, including genetic or evolutionary algorithms, and fuzzy logic systems. Fuzzy logic is a branch of logic based on approximate reasoning. Fuzzy logic allows the use of labels like "slightly," "moderately," and "very," so that statements may be made with varying degrees of precision. This flexibility is useful in coping with the imprecision of real-world situations, such as the management of distributed generation technologies.

SUMMARY OF THE PRESENT INVENTION

The present invention provides a system and method for managing energy systems such as DGE deployments, wherein the system can adapt to variable changing conditions in real-time to provide adaptable, real-time, site-specific load forecasting. In one embodiment, the energy management system of the present invention dispatches the power output of deployed generators (e.g., microturbines, reciprocating engines, fuel cells, photovoltaic cells). In another embodiment, the energy management system further controls heating and cooling equipment (e.g., boilers, chillers, fans, desiccant removal, dampers, etc.). The site controller of the present invention receives dispatch instructions from a remote central controller, in one embodiment, wherein the dispatch instructions offer recommendations for when to operate each generator, at what power level, when to store energy, and what needs take priority. The site controller compares the instructions to local information for further optimization.

In this way, the present invention balances remote dispatch commands against actual load conditions that are infrequently available at the source of the commands, the remote central controller in one embodiment. Equipment and software are provided for this purpose to practically use the suggestions from the remote location. In one embodiment, the present invention can make initial and locally influenced determinations entirely on site, such as by using the site controller. The present invention works with multiple types of generation equipment and control protocols, and considers economics, reserve margin, load following needs, redundancy requirements, actual electric and thermal load conditions and numerous other parameters to establish a comprehensive and thorough solution. Further, the present invention can receive operating instructions through the Internet and can make adjustments or complete changes to the received instructions to ensure that electric and thermal loads are served reliably.

In one aspect, the present invention provides an integrated collection of software modules that enable enterprises and energy service providers with a DGE deployment to efficiently manage consumption and procurement of energy. The present invention allows real-time analysis and intelligent control over enterprise-wide energy usage, as well as comprehensive reporting and monitoring. As a result, facilities are empowered to make real-time, accurate decisions regarding energy costs as they relate to business goals, such as product output, for example.

The present invention further empowers facilities to measure productivity and improve predictability, benchmark energy facilities across the entire enterprise, maximize leverage with energy suppliers by negotiating and procuring lower rates, and allocate costs across multiple production lines, departments or processes. The present invention can also help facilities determine marginal energy cost of production for various products and configurations, determine the energy cost-effectiveness of different production strategies, and automatically determine when to rely on local generation to minimize costs.

BRIEF DESCRIPTION OF THE DRAWINGS

FIGS. 9A through 14 show sample graphs for use in understanding various fuzzy variables associated with an algorithm according to the present invention.

FIGS. 18 through 22 are sample user interfaces whereby a user of the present invention can view information and/or configure settings for a DG site or DG equipment.

DETAILED DESCRIPTION OF A PREFERRED EMBODIMENT

Figure 1:
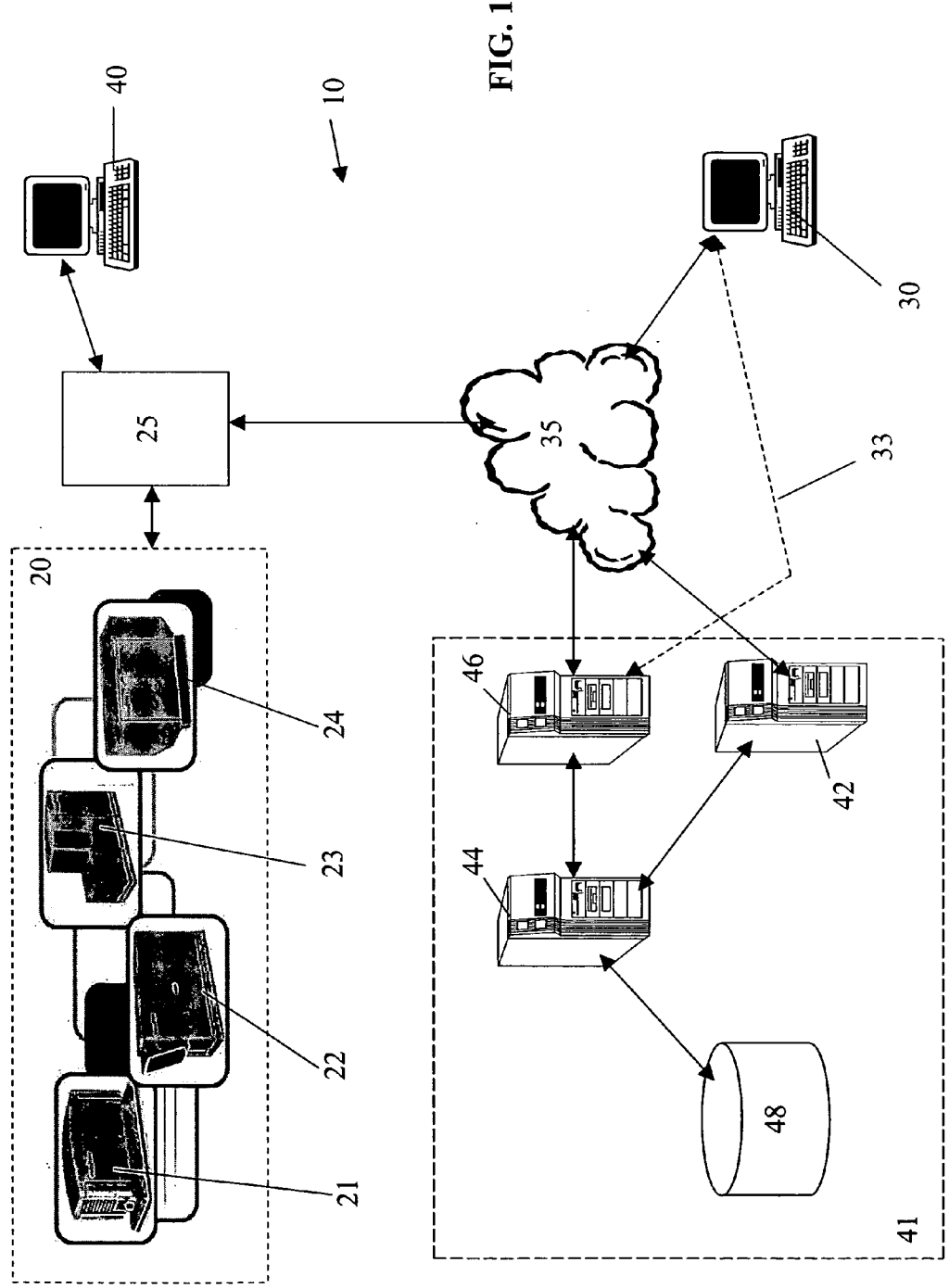
FIG. 1 shows a diagram of the architectural layout of one embodiment of the present invention.

As shown in FIG. 1, the system 10 of the present invention provides a method for controlling a distributed generation (DG) environment 20 using a site controller component 25. DG environment 20 can comprise one or more distributed generation technologies applied locally for a given enterprise's power needs. Example generation technologies can include internal combustion engines 21, mini-turbine systems 22, fuel cells 23 external combustion engines 24 and reciprocating engines. While not shown, distributed generation environment can also comprise a microgrid.

A user computer 30 or 40 can interact with the distributed generation environment via a network 35 such as the Internet via direct connection to site controller 25. User computer 30 can also access a System Operations Center (SOC) 41 containing a series of servers such as gateway server 42, middleware server 44 and web server 46. Such access can be via a public network 35 such as the Internet or via private connection 33. It will be appreciated that user computer 30 can be operated by a system operator, a facility operator associated with the DG environment 20 or even a utility operator. Configuration computer 40 can be operated by a facility operator or an installation technician, for example. User interfaces for configuring a DG site and DG equipment are described more completely hereinafter. It will be appreciated that the present invention contemplates that appropriate encryption and authentication mechanisms can be employed to create a secure operating environment for the present invention, as is commonly known in the art.

Middleware/application server 44 can access database 48 which stores information for operating the system of the present invention, including algorithm database tables and schema. Applications running on application server can include a load forecasting application used in forecasting energy usage load for, and recommending operating parameters to, the distributed generation environment 20. The load forecasting application can include a parameter identification component for determining periodic energy load usage of the DG environment and a load profile prediction component for generating energy usage load forecast profiles for the DG environment. The load forecasting application may also include a report component for generating energy usage load forecast profiles.

Load profile prediction component can be provided to keep energy usage within the range of the generating units, automatically manage load following requirements, and implement predetermined load management initiatives to match supply and demand. The load profile prediction component can also determine the most efficient operating schedule for units based on forecasted load, fuel prices and rate schedules from suppliers. The load profile prediction component can further regulate the power output of units based on changes in frequency and time error, and can combine the procurement of fuel for heating, cooling and power generation to reduce the total cost of energy.

Figure 2:
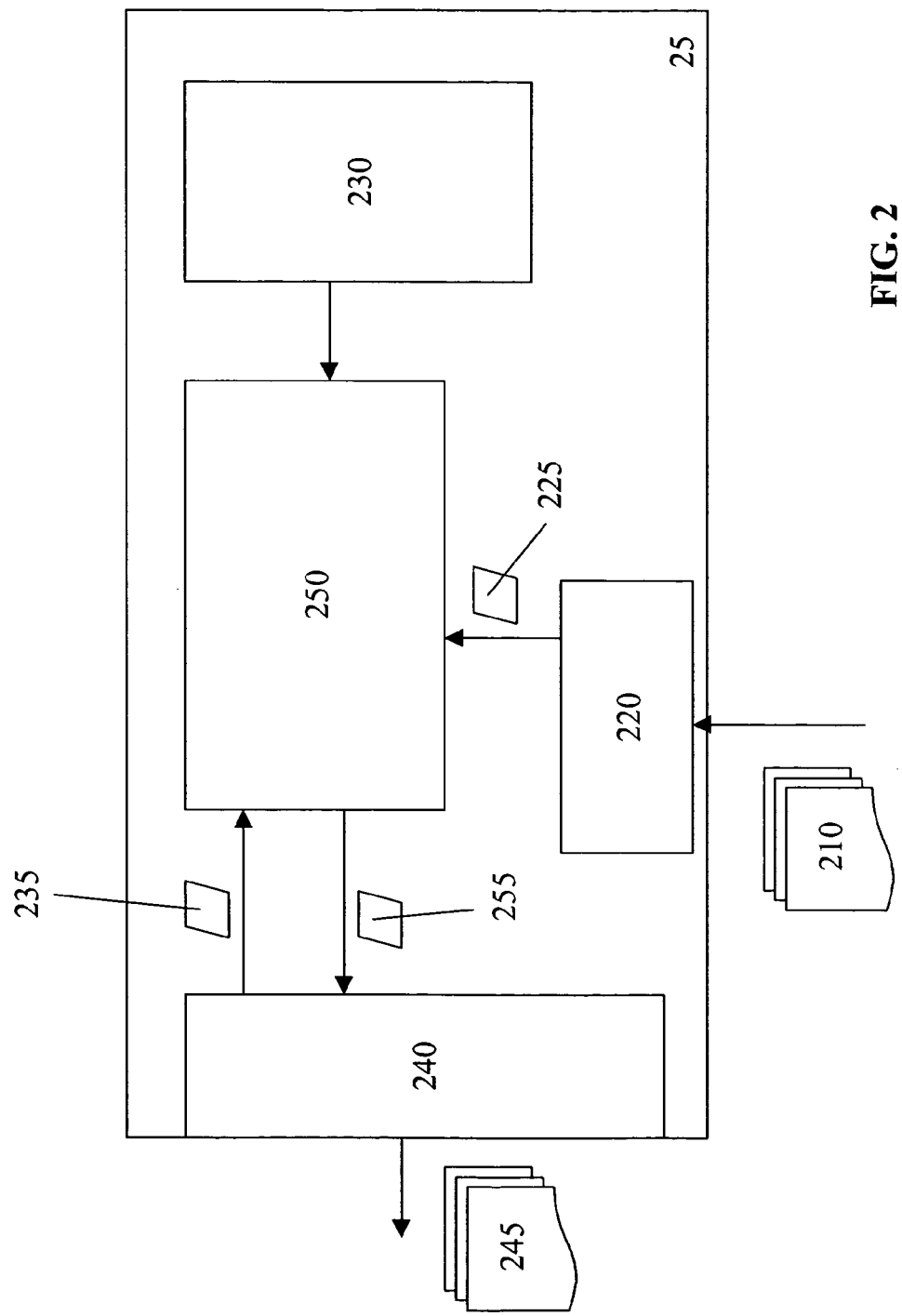
FIG. 2 shows a block diagram of one embodiment of the site controller of the present invention.

As shown in FIG. 2, site controller 25 can comprise computer memory and processing capability for operating programs such as one or more algorithmic programs represented by component 250. Algorithm programs receive dispatch information 210 and operating information 235 to help determine output 255 for instructing the current distributed generation deployment. It will be appreciated that the present invention can employ algorithmic programs at both the SOC and the site controller in order to optimize operation. Device interface 240 receives instructions from program and sends the output 245 to the respective equipment involved. Site controller configuration information 230 affects the algorithm processes, and includes information such as the device types on-site, the default site state, the grid connection type and the minimum and maximum generation output levels. User interfaces for configuring a DG site and DG equipment are described more completely hereafter.

Dispatch information 210 can include commands sent from the SOC 41 via gateway server 42. Such commands can be developed using the SOC load forecasting application, load profile prediction component or other algorithm applications, and can include the site record, time record and device record, if any. The site record can include operating mode, operating setpoint and device setpoint, for example. Time record can include start time and duration, for example. Device record can include device setpoint, for example.

A site controller command manager 220 receives the dispatch information, and stores the pending commands in order based on time-to-start. The site controller command manager further contains a "default" command in case no pending commands are received from the SOC 41. At the appropriate time, command manager 220 sends the active command 225 to algorithm component 250 for processing. Real-time site conditions 235 are also inputted into algorithm component 250, and can include generator output(s), grid draw, generator communication status and grid connection status, for example.

Upon performing the necessary computations, algorithm component 250 can send a generic control message 255 to universal protocol converter (UPC) 240. UPC 240 then converts generic control data into device-specific control data based on the type(s) of devices on site and the particular device's communication protocol. In one embodiment, the UPC is software embodied and operating within the site controller 25 and the site controller 25 packages its dispatch commands in a control message of the type "device_msg". This is the same structure it uses to receive monitoring points from the UPC. An example structure can appear as follows:

---

1. device_type   Specifies a constant integer corresponding to a generator
                type. E.G. ENI150, ENI75. These constants are standard-
                ized in an enumeration called DEV_TYPE that can
                be included in both the Site Controller and UPC for
                consistency.
                    typedef enum
                    {            ENI_75
                                 ENI_150
                                 ENI_MID,
                                 ENI_1000,
                                 ENT_400,
                                 CAPST60,
                                 DIMAG,
                                 KATOLIGHT,
                                 GENERAC_F,
                                 TEMP_NODE,
                                 WATT_NODE,
                                 VERIS_MTR,
                                 EC_230,
                                 H8923,
                                 ACRO_IO
                                 MON_DEV,
                                 OTHER_TYPE,
                    }DEV_TYPE;
2. device_num   Specifies the zero-based index of the device within a
                group of devices of the same type. For example, if there -continued are three ENI150's on a single site, they are numbered 0,
                1, and 2. So when a message is sent with device_type
                ENI150, the specific unit that the message is intended for
                can be deduced by checking the device_num member
                of the message for a value of 0, 1, or 2.
3. MB_data      The data structure that encapsulates all the MODBUS,
                LonTalk has arrays that correspond to the MODBUS
                protocol's registers:
                    typedef struct
                    {
                        Byte BWR[ 150 ]; /* monitor */
                        Byte BW [ 150 ]; /* control */
                        Byte BR [ 150 ]; /* monitor */
                        Word WR [ 150 ]; /* monitor */
                        Word WW [ 150 ]; /* control */
                        Word WWR[ 150 ]; /* monitor */
                    }MB_data;

---

The site controller can also use the Interprocess Communication Daemon (IPCD), a mechanism for communication with other applications on the same hardware platform, to deliver the message to the particular device. In this case, the UPC converts the ctl_data_array portion of the message to a set of MODBUS points before sending them off to the specified device via one of the UPC/site controller's serial ports. It should be noted that the UPC can act simply as a pass-through for data. The site controller 25 is responsible for being "aware" of the necessary control parameters that must be set to achieve a desired result.

In order to receive the monitoring data that is necessary to perform dispatch determinations, the site controller 25 also receives messages 235 from the UPC that encapsulate an individual measuring device's data points. The UPC simply cycles through the deployed devices, packaging each one's respective data values in a separate "device_msg" object before delivering them to the site controller 25 via the ICPD, for example, as soon as they are available. The structure's members are applied as they are for control except for the data points structure, such as the following, for example:

---

1. device_type   Specifies a constant integer corresponding to a
                generator or analog measurement device type. E.G.
                ENI150, ENI75. These constants are standardized in an
                enumeration called DEV_TYPE that will be included
                in both the Site Controller and UPC for consistency.
2. device_num   Specifies the zero-based index of the device within a
                group of devices of the same type.
3. Data points  Because some of the monitoring devices can be LonTalk,
                for example, the device_msg structure can support a
                data array other than the MB_data shown in the previous
                section. The site controller checks the device_type,
                then extracts the data from the appropriate structure and
                can disregards the rest.

---

In one embodiment, the algorithm component 250 uses artificial intelligence to reduce the overall cost to serve a customer's load with distributed generation equipment. The algorithm component 250 is fed with forecasted electric and thermal loads as represented by dispatch commands 210, which are determined based on past load trends and current conditions. The dispatch algorithm then ranks the available generation, electric grid and other thermal or electric generating equipment by the suitability to serve the forecasted thermal and/or electric loads. The ranking in a primary embodiment is based on minimizing the total cost of serving load and maintaining customer specified reliability. Reliability and other customer specific parameters can be established when configuring the DG deployment, and can be maintained and/or changed via user interface 30 or 40.

In addition to the forecasted load, the algorithm can consider various static and dynamic site parameters, including, for example, the DGE's fuel cost, maintenance cost, thermal output, electric output, optimal operating point, full load capacity, start up cost, shut down cost, time to major/minor overhaul, major/minor overhaul cost, major/minor overhaul hourly cost, hours of operation, grid price, thermal capacity costs, load following requirements, reserve margin, "n−1" requirements, equipment heat output, running status, de-rating based on ambient conditions and other critical parameters. In one embodiment, the algorithm reaches beyond improved economics to consider the customer's reliability needs, dispatching equipment based on parameters such as reserve margin, load following needs and redundancy to enhance the reliability of serving load. Thus, cost need not always be the primary influence for the ranking component of the present invention.

In more completely explaining the above site parameters, load matching is the process of matching the optimal economic operating point of the generation to the load that needs to be served. Load following refers to a generating unit that has the ability to quickly change its output to serve changes in load. Load forecasting is the prediction of maximum electric load that would be required for a given duration (either short-term or long-term). Load forecasting is required so that the most economic distribution of load between the generating units can be determined.

Regarding hourly dispatch, in one embodiment, once every hour, at a configurable "lead" before the beginning of each hour, the algorithm component can be programmed to run and create a dispatch scheme for every site that is designated as having its devices dispatched per the algorithm of the present invention. The command is durable, in the sense that the present invention will continue to send the command until it is successfully received by, for example, the Microsoft™ Message Queue (MSMQ) and, therefore, successfully handed off to the appropriate application for forwarding to the site controller.

The fuel cost can be either a static, dynamic or complex gas utility rate parameter that is an entry into the System Operations Center (SOC) server-side algorithms in $/MMBTU. Regarding grid comparison, the cost of electricity that distributed generation needs to be compared to can be either a static, dynamic or complex electric utility rate parameter that is an entry into the algorithms in cents per kWh, for example.

Start-up cost is the cost for fuel before the unit is available to carry load plus the effect of reduced time before overhaul. This is a static parameter to be entered during unit configuration and used by the algorithms. Shut down cost is the cost for fuel during the units cool down period plus the effect of reduced time before overhaul. This is a static parameter to be entered during unit configuration and used by the SOC server-side algorithms.

Figure 5:
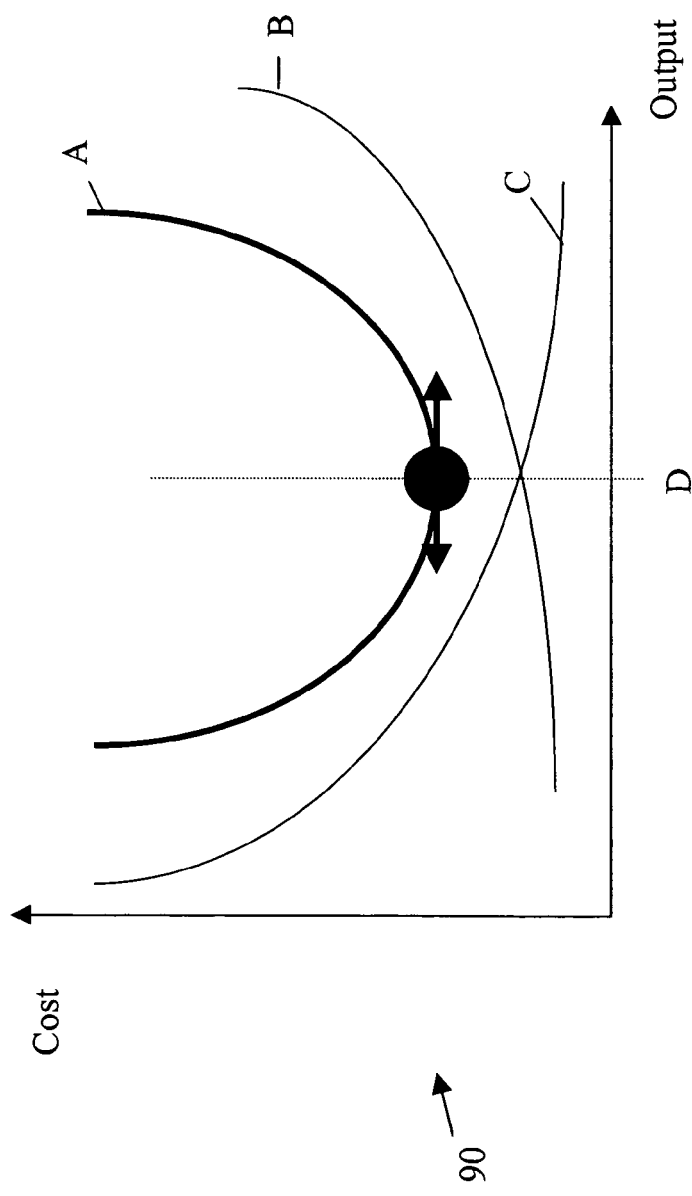
FIG. 5 shows a graph of an optimal operating point in accordance with one embodiment of the present invention.
Figure 16:
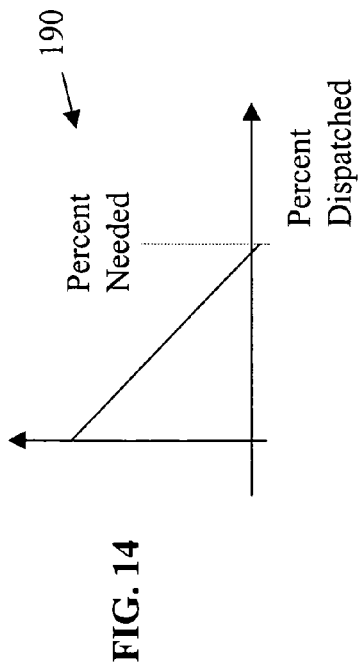
FIG. 16 is graph illustrating a time before overhaul parameter of the present invention.

Regarding the effect of operating point (see D in FIG. 5) on maintenance cost, with most distributed generation products, the time before overhaul (TBO) is significantly effected by the operating point of the unit. Typically, there is no effect up to a certain output level, and then a dramatic effect above this level. This is illustrated in diagram 302 in FIG. 16. To avoid reduced TBO and the associated increased cost, it is generally best to operate equipment at the knee 304 in the curve. Regarding dispatch to serve load, in some cases, sites may not want to consider the thermal aspects (e.g., no CHP equipment purchased, better heating alternatives, etc.). In these cases, the dispatch to thermal load can be disabled and only electric load will be considered.

It will be appreciated that two different conditions may cause the redetermination of the economic dispatch based on the request from the site controller. In the first condition, upon receipt of the initial document (which can be in XML, for example) that represents the suggested dispatch, the site controller may determine that the suggestion falls outside some delta comparison against the current load that it is servicing, for example. In this case, the site controller will set a boolean control point indicating the need for redetermination back to the server-side gateway 42. This can be represented in the database 48 as a row value in a table changing, for example. A process can be provided to monitor this database value and react by kicking off the redetermination of the economic dispatch, resulting in a second XML document being sent to the site controller with a new suggested dispatch.

In the second condition, the site controller monitors the load approximately every second and will react to a "spike" by setting the boolean control point as outlined above. The site controller can avoid unnecessary or frequent redeterminations through delay and hysteresis schemes, for example.

Regarding the consideration of de-rating units for temperature, each unit's adjusted output capacity can be de-rated according to the following function based on the site's ambient temperature (F) and elevation (ft above sea level).

$$C_{adj} = \begin{cases} C_{nominal} * (1 - .000034 * A) & \text{if } T_{ambient} \leq T_{nominal} \\ m_{de\text{-}rate} * (T_{ambient} - a) * (1 - .000034 * A) & \text{if } T_{ambient} > T_{nominal} \end{cases}$$

where
$m_{de\text{-}rate}$=Slope of de-rate line derived from data points from actual machine run (currently calculated at −5.5 using data points $(X_F, Y_{KW})$ of (80, 477) and (90, 422). This should probably be re-determined using the de-rate startpoint as one of the points.

and
$a = ((C_{no\ min\ at} \div m_{de\text{-}rate}) - T_{de\text{-}rateStartPoint})$ where $T_{de\text{-}rateStartPoint}$=modifiable parameter defining temperature at which the unit first experiences a de-rating.

FIGS. 17A through 17D show sample graphs 310, 312, 314 and 316, respectively, exemplifying this determination.

Given the fact that different types of units have different curve shapes, one appropriate way to de-rate units for temperature and altitude is to allow the configuring technician to enter a manufacturer's curve with up to 10 points. Each point will consist of either a temperature (degrees F.) or an altitude (relative to sea level) and a percent of nominal rating. Note this requires that for a device type, two curves be entered. The default, in this embodiment, should be 100% for all points. In this embodiment, assumptions can be made that de-rate functions for both temperature and altitude are linear. In one embodiment, the de-rate for temperature can begin at 59 degrees F. and the de-rate for altitude can begin at sea level.

Reserve margin can be a site parameter that is included by the SOC installation technician during set-up of the site, or it can be set at the SOC for economic dispatch. This variable is a percentage and can be used when the site is not grid connected as follows:

Electric Load to be Met=(1+Reserve Margin)×Forecasted Electric Load

If the site is grid connected, the reserve margin is set to 0%. The default value will be 20% when the site is not grid connected.

The "n−1" requirement can be optional per site. A given device set at a site having this requirement, instead of directly using the full-load capacity value, would use a "headroom capacity". For example, if the site's grid connection mode is "grid isolated" and if the n−1 requirement has been enabled, the headroom capacity is the capacity left when the largest member of the set fails and its suggested operating capacity is subtracted from the set total. Essentially, this requirement means that the site's maximum output is the sum of all but its largest device if it is in the correct modes.

$$Site_{max} = \sum_{i=1}^{n-1} Device_i$$

where $Device_i$ is a list of devices in ascending order ranked by their output.

While considering all of the above factors simultaneously, the algorithm component is attempting to match the load to the generation's optimal operating point, which is the transition point between decreasing fuel cost and increasing maintenance cost. This is illustrated in the diagram 90 in FIG. 5, which charts Output vs. Cost. As shown in the diagram 90, the maintenance cost curve B and the fuel cost curve C combine to form total cost curve A. Point D represents the amount of output at which cost is optimized, i.e., minimized. As shown, a tradeoff is made between reducing fuel cost with increasing output level and increasing maintenance cost with increasing output level. Each unit is thereby ranked in merit order to be dispatched to serve the load. After each unit is dispatched, the remaining units are re-ranked to serve the remaining load. In one embodiment, fuzzy logic is used to derive rankings.

Fuzzy logic makes it possible to express the control system of the present invention with a set of fuzzy rules. A fuzzy rule is an "IF-THEN" statement of a desired control action using human language variables. An example of a fuzzy rule would be "If the cost is high, then set consumption to low." Any number of fuzzy rules can be used to express the total system control action. They can use any number of variables and may be as complex as desired. The controller can consider as many system inputs and outputs as desired. "Fuzzy variables" are linguistic or inexact variables, and can be described by membership functions. In one embodiment, the present invention considers both iterative and non-iterative fuzzy variables. Non-iterative fuzzy variables included in the present invention can include, for example, cheap electricity, expensive electricity, cheap heat, expensive heat, low hours (of operation) and high hours. Iterative fuzzy variables incorporated in the present invention can include, for example, "good", "bad" and "very good" non-iterative dispatch membership, "good", "bad" and "very good" electric match membership, "good" and "bad" thermal match membership, "good" and "bad" load match, and "good" and "bad" load following match membership.

Each fuzzy variable used in a fuzzy rule is evaluated for the degree of "membership" the measured input has in that fuzzy variable. For example, if the cost is 0.5 cents ($0.005) below the highest cost, the algorithm component may determine this variance has a 10% possibility of being considered "cheap electricity." This means that "0.5 cents" has a membership of 0.1 in the set of "cheap electricity" values. At the same time, 0.5 cents below the highest cost may have a membership of 0.9 in the set of "expensive electricity" values. This process of assigning memberships to all the measured system inputs into the fuzzy variables is called "fuzzification." Defuzzification is the process of interpreting the combined memberships into specific output, i.e., control commands.

After all the inputs are fuzzified, each fuzzy rule is evaluated for its level of "trueness." All of the memberships for the relevant fuzzy variables are combined using inference logic to arrive at a "total" fuzzy rule trueness or validity for the existing system inputs. Any particular fuzzy rule may have any value of trueness from 0 (false) to 1 (completely true) or any value in between (0.5 would mean half true, for example). All fuzzy rules that have any degree of trueness are combined using an averaging technique to yield a total control action. The fuzzy rules are repeatedly evaluated to give a continuous control action output. Although the example above addressed only unit cost, the same types of fuzzy rules can be used for other variables and other combinations of variables.

Figure 3:
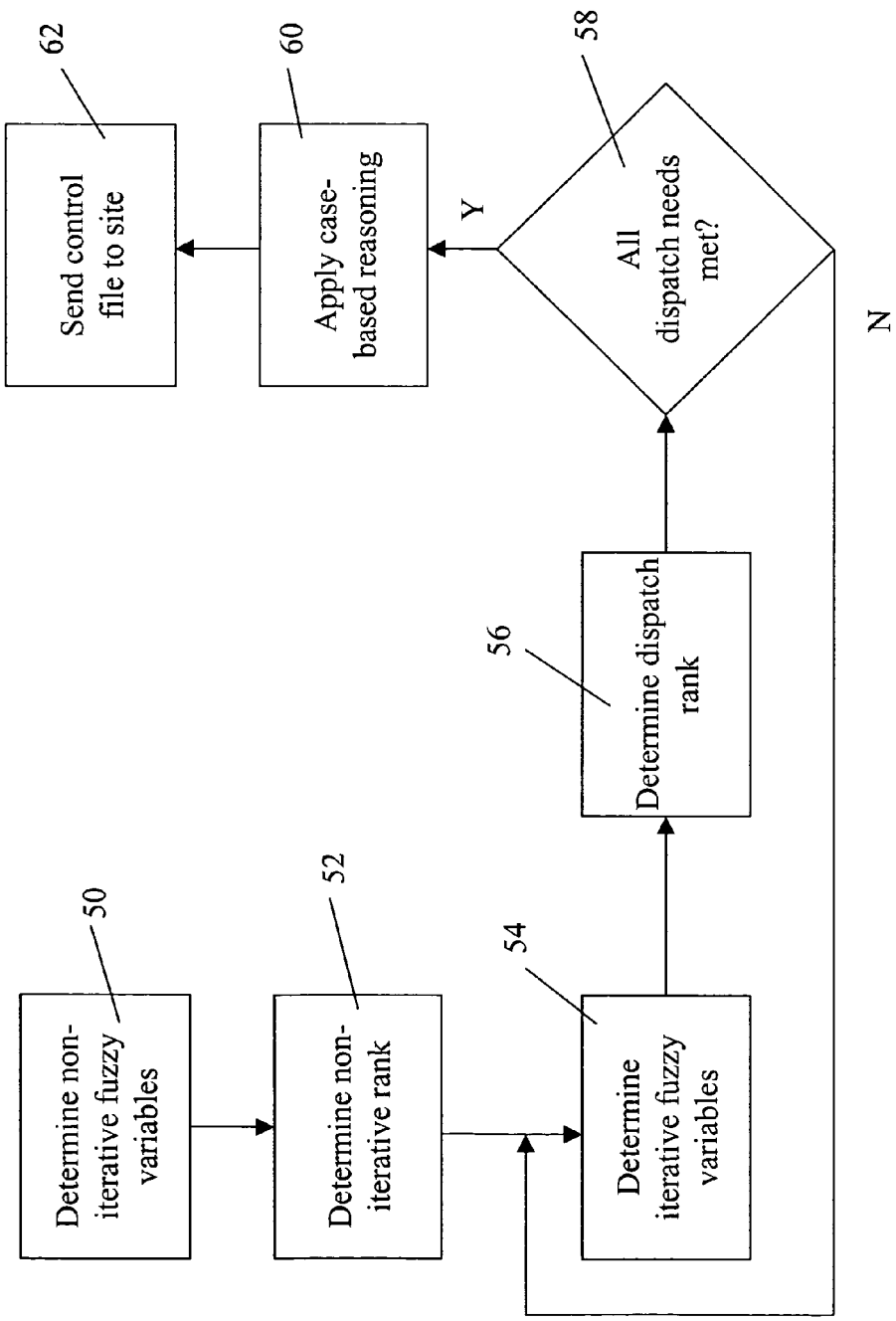
FIG. 3 shows a dispatch flow chart in accordance with one embodiment of the present invention.

The determination of each of these variables is shown below. With these variables, fuzzy truth tables can be established for determining the dispatch ranking. In one embodiment, the ranking is provided by a number from negative six to positive six with the lower number being considered a better dispatch ranking. A flow chart of this determination is shown in FIG. 3.

Example Non-Iterative Fuzzy Variables

A. Cheap Electricity

Figure 9A:
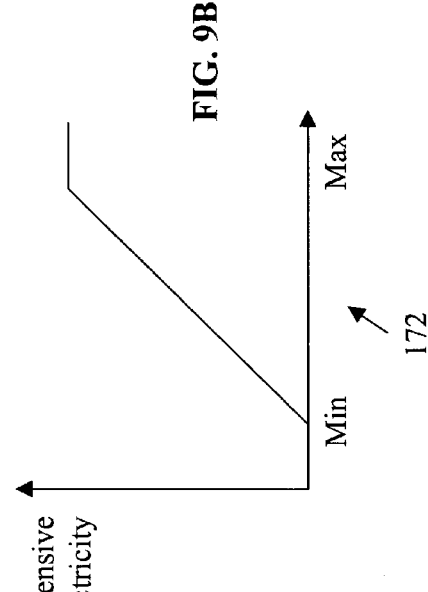

A graph 170 for the Cheap Electricity variable is shown in FIG. 9A. Cheap Electricity is determined as follows.

Variables
    Max—highest cost in cents per kWh for available units
    Min—lowest cost in cents per kWh for available units
    Unit—current unit cost in cents per kWh
    Remaining Electric Load=
    Forecasted Load−Current Electric Dispatch
    Cheap Electricity=1−(Unit−Min)/(Max−Min)

Exceptions:
    If Remaining Electric Load<=0, then Cheap Electricity=1
    If Unit>=Max, then Cheap Electricity=0
    If Unit<=Min, then Cheap Electricity=1

B. Expensive Electricity

Figure 9B:
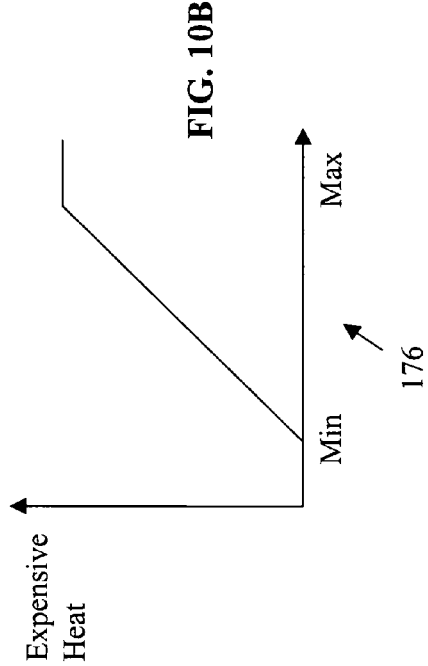

A graph 172 for the Expensive Electricity variable is shown in FIG. 9B. Expensive Electricity is determined as follows.

Expensive Electricity=1−Cheap Electricity

Exceptions:
    If Remaining Electric Load<=0, then Expensive Electricity=1

C. Cheap Heat

Figure 10A:
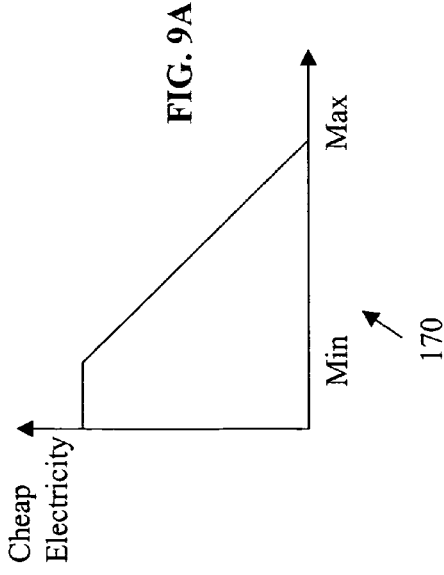

A graph 174 for the Cheap Heat variable is shown in FIG. 10A. Cheap Heat is determined as follows.

Variables
    Max—highest cost in dollars per MMBTU for available units
    Min—lowest cost in dollars per MMBTU for available units
    Unit—current unit cost in dollars per MMBTU
    Remaining Thermal Load=

Forecasted Load−Current Thermal Dispatch
Cheap Heat=1−(Unit−Min)/(Max−Min)

Exceptions:
  If Remaining Thermal Load<=0, then Cheap Heat=1
  If Unit>=Max, then Cheap Heat=0
  If Unit<=Min, then Cheap Heat=1
  If Consider Thermal Dispatch=FALSE, then Cheap Heat=1
  If Consider Heat Output for Unit=FALSE, then Cheap Heat=1

Figure 10B:
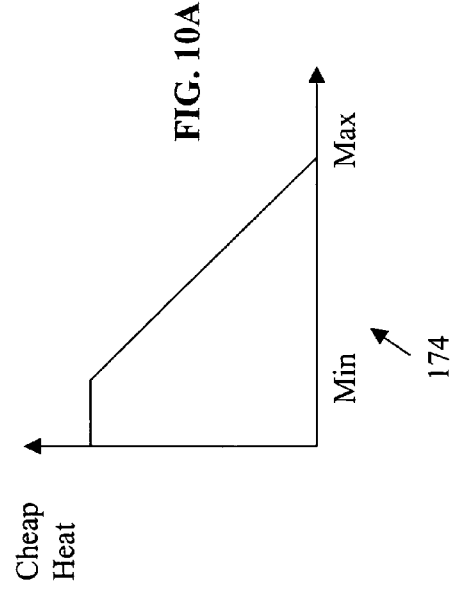

D. Expensive Heat
  A graph 176 for the Expensive Heat variable is shown in FIG. 10B. Expensive Heat is determined as follows.
  Expensive Heat=1−Cheap Heat Exceptions:
  If Remaining Thermal Load<=0, then Cheap Heat=1
  If Consider Thermal Dispatch=FALSE, then Expensive Heat=1
  If Consider Heat Output for Unit=FALSE, then Expensive Heat=1

Figure 11A:
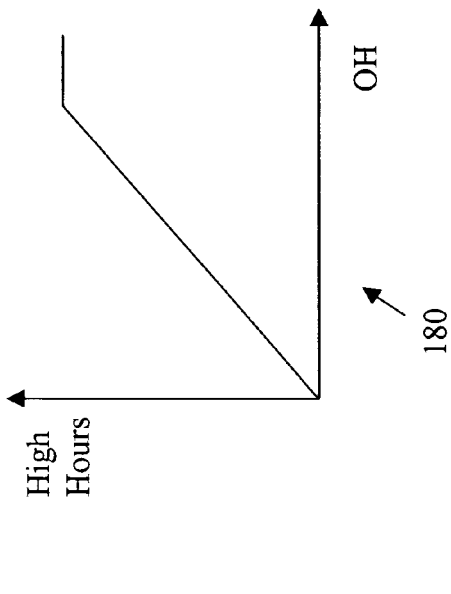

F. Low Hours
  A graph 178 for the Low Hours variable is shown in FIG. 11A. Low Hours is determined as follows.

Variables
  OH Time—Typical Time to Overhaul the Unit
  Runtime—Number of Hours the Unit has been Run
  Low Hours=1−Runtime/OH Time Exceptions:
  If Runtime>=OH Time, then Low Hours=0

Figure 11B:
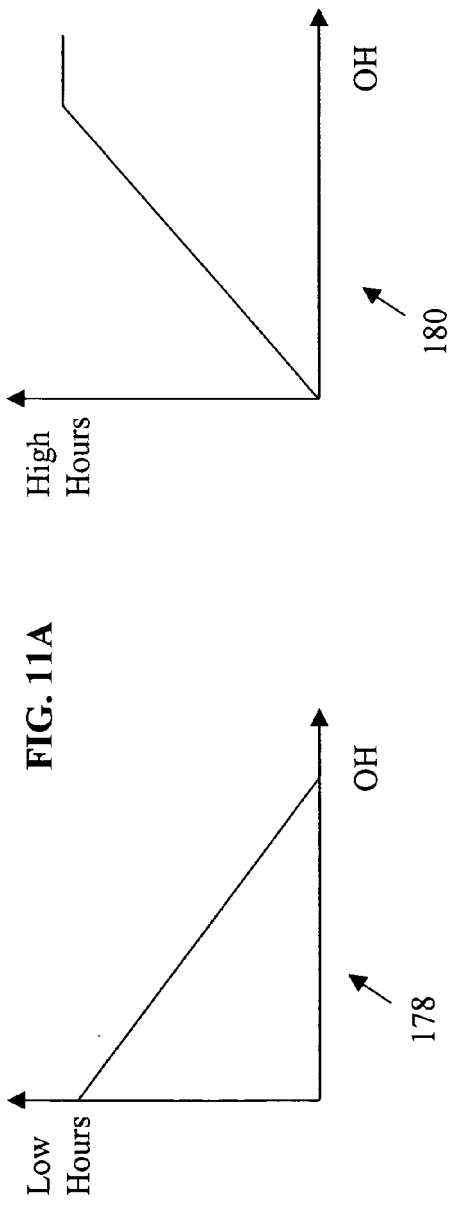

G. High Hours
  A graph 180 for the High Hours variable is shown in FIG. 11B. High Hours is determined as follows.

High Hours=1−Low Hours

Example Iterative Fuzzy Variables

Figure 12:
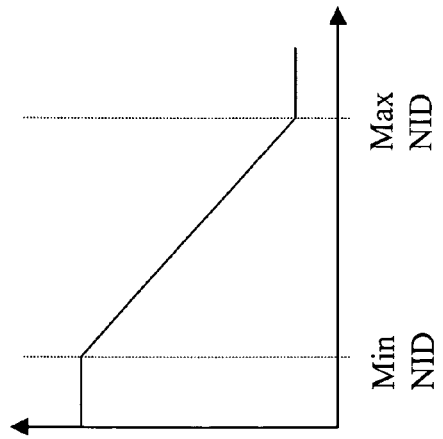

A. Good Non-Iterative Dispatch Membership
  A graph 182 for the Good Non-Iterative Dispatch Membership variable is shown in FIG. 12. Good Non-Iterative Dispatch Membership is determined as follows.

Variables
  NID—Non-Iterative Dispatch
  Max NID—Maximum Non-Iterative Dispatch Membership
  Min NID—Minimum Non-Iterative Dispatch Membership
  Referring to the highest/lowest NID found for a site
  Good NID=1−((NID−Min NID)/(Min NID−Max NID))

Exceptions:
  If NID<=Min NID, then Good NID=1
  If NID>=Max NID, the Good NID=0

B. Bad Non-Iterative Dispatch Membership
  Bad Non-Iterative Dispatch Membership is determined as follows:
  Bad NID=1−Good NID C. Very Good Non-Iterative Dispatch Membership
  Very Good Non-Iterative Dispatch Membership is determined as follows:
  Very Good NID=(Good NID)$^2$ D. Good Electric Match Membership
  Graphs 184, 186 and 188 for the Good Electric Match Membership variable are shown in FIGS. 13A, B and C. Good Electric Match Membership is determined as follows:

Variables—All Referring to Electrical Load
  EM—Electric Match
  OpCap—Optimal Capacity of Unit (kW)
  Max OpCap—Maximum Un-Dispatched OpCap for Site
  Min OpCap—Minimum Un-Dispatched OpCap for Site
  RemLoad—Remaining Load to be Served—The load that capacity has not yet been dispatched to serve
  PosLimit—A Limit on the Percentage Deviation Above RemLoad
  NegLimit—A Limit on the Percentage Deviation Below RemLoad Good EM=
  If RemLoad<Min OpCap, then
  Good EM=1−((OpCap−Min OpCap)/(Max OpCap−Min OpCap))
  If RemLoad>Max OpCap, then
  Good EM=((OpCap−Min OpCap)/(Max OpCap−Min OpCap))
  If {Min OpCap<RemLoad<Max OpCap} AND OpCap<RemLoad,
  then Good EM=(OpCap−RemLoad)/OpCap−NegLimit)/NegLimit
  If {Min OpCap<RemLoad<Max OpCap} AND OpCap>RemLoad,
  then Good EM=1−(1/PosLimit)×((OpCap−RemLoad)/OpCap)

Exceptions:
  RemLoad<0, then Good EM=1
  If RemLoad<Min OpCap AND OpCap<=Min OpCap, then Good EM=1
  If RemLoad>Max OpCap AND OpCap>=Max OpCap the Good EM=1
  If {Min OpCap<RemLoad<Max OpCap} AND {NegLimit>((Op Cap−RemLoad)/Op Cap)>PosLimit}, then Good EM=0
  If Grid Connected or After Load Following Need has been met, PosLimit=0.75 and NegLimit=−2.5.
  Before Load Following Need has been met, PosLimit=1 and NegLimit=−1.

E. Bad Electric Match Membership
  Bad Electric Match Membership is determined as follows:
  Bad EM=1−Good EM Exceptions:
  If RemLoad<0, the Bad EM=1

F. Bad Thermal Match Membership
  Bad Thermal Match Membership is determined as follows:
  Bad TM=1−Good TM Exceptions:
  If RemLoad<0, the Bad TM=1

G. Good Load Match Membership
  Graphs 184, 186 and 188 shown in FIGS. 13A, B and C, respectively, also apply for the Good Load Match Membership variable. Good Load Match Membership is a fuzzy operation of Good Electric Match and Good Thermal Match and is determined as follows:
  Good Load Match=Minimum(Good Electric Match, Good Thermal Match)

Exceptions:
  If Consider Thermal=FALSE AND Consider Electric=TRUE, then
    Good Load Match=Good Electric Load Match
  If Consider Thermal=TRUE AND Consider Electric=FALSE, then
    Good Load Match=Good Thermal Load Match H. Bad Load Match Membership Bad Load Match Membership is a fuzzy operation of Bad Electric Match and Bad Thermal Match and is determined as follows:
  Bad Load Match=Minimum(Bad Electric Match, Bad Thermal Match)

Figure 14:
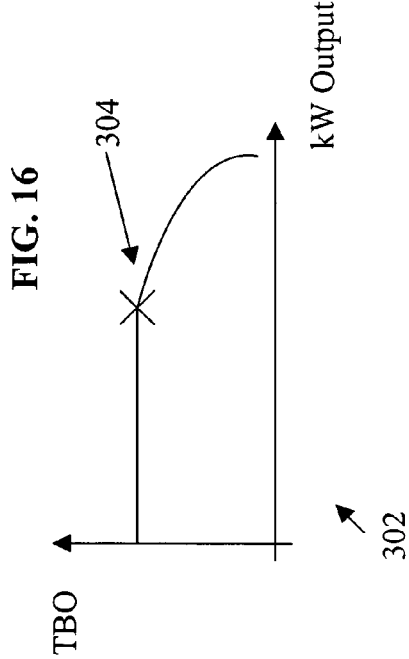

Exceptions:
  If Consider Thermal=FALSE AND Consider Electric=TRUE, then
    Bad Load Match=Bad Electric Load Match
  If Consider Thermal=TRUE AND Consider Electric=FALSE, then
    Bad Load Match=Bad Thermal Load Match I. Good Load Following Match Membership A graph 190 for the Good Load Following Match Membership variable is shown in FIG. 14. Good Load Following Match Membership is determined as follows.
  If Grid Connected=True, then Good Load Following Match Membership=1
  If Grid Connected=False AND Grid Connected=False, then Good Load Following Match Membership=0
  If Grid Connected=True AND Grid Connected=False, then Good Load Following Match Membership=
    1−(Percent Dispatch Load Following/Percent Need Load Following)

J. Bad Load Following Match Membership

Bad Load Following Match Membership is determined as follows.
  If Grid Connected=True, then Bad Load Following Match Membership=1
Otherwise,
  Bad Load Following Match Membership=1−Good Load Following Membership It will be appreciated that other iterative and non-iterative variables can be used.

Non-Iterative Truth Table and Centroid Rank Determination

For each unit available to be dispatched, the non-iterative rank can be determined as at 52 in FIG. 3. If a unit is not available for dispatch, this variable can be set equal to a value meaning not available for dispatch, such as "6" in the present example.

In Table 1 below, each element represents the fuzzy variable membership. For example, Electricity Cheap is the Cheap Electricity membership variable.

TABLE 1

| Electricity | Heat | Hours | Element Rank |
|---|---|---|---|
| Cheap | Cheap | Low | −2 |
| Cheap | Cheap | High | −1 |
| Cheap | Expensive | Low | 0 |
| Cheap | Expensive | High | 1 |
| Expensive | Cheap | Low | 2 |
| Expensive | Cheap | High | 3 |
| Expensive | Expensive | Low | 4 |
| Expensive | Expensive | High | 5 |

$$\text{Non-Iterative Centroid Rank} = \frac{\sum_{all\ elements} \{\min(\text{electricity, heat, hours}) * \text{rank}\}}{\sum_{all\ elements} \{\min(\text{electricity, heat, hours})\}}$$

Iterative Truth Table and Centroid Rank Determination

In Table 2 below, each element represents the fuzzy variable membership. For example, Non-Iterative Bad is the Bad Non-Iterative Dispatch Membership. It will be appreciated that the rank changes for whether the site is grid connected or not. When the site is not grid connected, the dispatch rank changes in the case of the load following requirements being met.

TABLE 2

| | | | Element Rank | | |
|---|---|---|---|---|---|
| Non-Iterative | Load Match | Load Follow Match | Grid | After LF | Before LF |
| Bad | Bad | Bad | 5 | 5 | 6 |
| Bad | Bad | Good | 5 | 5 | 5 |
| Bad | Good | Bad | 0 | −0.7 | 6 |
| Bad | Good | Good | 0 | −0.7 | 0 |
| Bad | Very Good | Good | −0.7 | −1.7 | −1 |
| Good | Bad | Bad | −1 | −1.5 | 6 |
| Good | Bad | Good | −1 | −1.5 | 4 |
| Very Good | Bad | Good | −2 | −2.5 | 3 |
| Good | Good | Bad | −5.5 | −5.8 | 6 |
| Good | Good | Good | −5.5 | −5.8 | −5.5 |
| Very Good | Very Good | Good | −6 | −6 | −6 |

For a given condition, (either Grid-connected, After LF needs met, or Before LF needs met), the Rank formula is:

$$\text{Non-Iterative Centroid Rank} = \frac{\sum_{all\ elements} \{\min(noniterative,\ loadmatch,\ loadfollowingmatch) * \text{rank}\}}{\sum_{all\ elements} \{\min(noniterative,\ loadmatch,\ loadfollowingmatch)\}}$$

Dispatch Needs

As shown in FIG. 3, the algorithm can repeatedly step through the process of determining the iterative fuzzy variables, dispatching a unit at optimal capacity, determining the remaining thermal and electric load and repeating until all thermal and electric load needs are met. In the first pass of the algorithm the non-iterative fuzzy variables are determined, with the results to be used for the remainder of the process. In the case of a site that is not concerned about dispatch to serve thermal load, the appropriate load will not be considered.

Where applicable, the iterative dispatch should continue if any of the following conditions are true:

Total Dispatched Optimal Electric Capacity×(1+Max Deviation from Optimal Point (%))>Forecasted Electric Load;      (a)

Total Dispatched Optimal Thermal Capacity×(1+Max Deviation from Optimal Point (%))>Forecasted Thermal Load;      (b)

$N$=1 Excess(=Total Maximum Capacity−Maximum Optimal Capacity)−Forecasted Electric Load<0;      (c)

Reserve Margin Excess(=Total Maximum Capacity−(1−Reserve Margin (%))×Forecasted Electric Load)<0, or      (d)

Dispatched Load Following Percentage(=Optimal Capacity of Load Following Units/Forecasted Electric Load)+2%<Amount of Load Following Required (%)      (e)

When the iterative dispatch is complete, the unit outputs will have to be adjusted from the optimal operating point to meet the forecasted load as follows:

Dispatch Electric Point for Each Unit=Optimal Electric Point+(Forecasted Electric Load−Total Dispatched Optimal Electric Capacity)×(Units Max Capacity/Total Dispatch Maximum Capacity)

This determination only need be performed when the site is not grid connected. If the site is grid connected, the units shall be dispatched at their optimal point without adjustment.

As shown in FIG. 3, a dispatch flow chart can process information as follows. As shown at 50, non-iterative fuzzy variables are determined, and a non-iterative rank is determined as at 52. Iterative fuzzy variables are determined as at 54 and a dispatch rank is determined as at 56. If all dispatch needs are met at 58, case-based reasoning can be applied as at 60 and a control file can be sent to the distributed generation site as at 62. If dispatch needs are not met at 58, iterative fuzzy variables and a dispatch rank are again determined. This process repeats until all dispatch needs are met.

Figure 4:
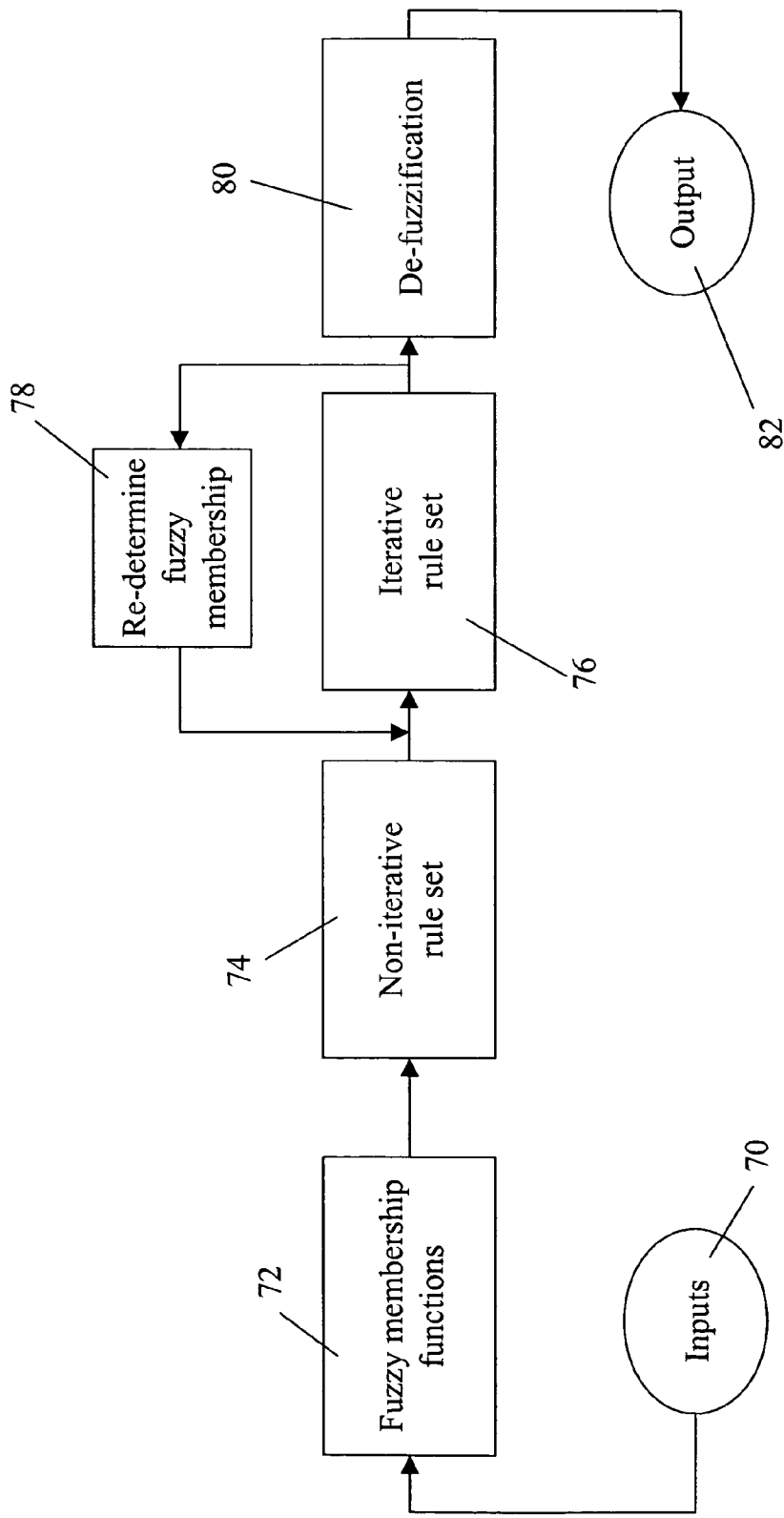
FIG. 4 shows a dispatch algorithm structure in accordance with one embodiment of the present invention.

As shown at FIG. 4, the dispatch algorithm structure involves receiving inputs 70, performing fuzzy membership functions 72, performing the non-iterative rule set 74, performing the iterative rule set 76, re-determining fuzzy membership 78 as necessary, performing defuzzification as at 80, and presenting outputs 82.

Figure 6:
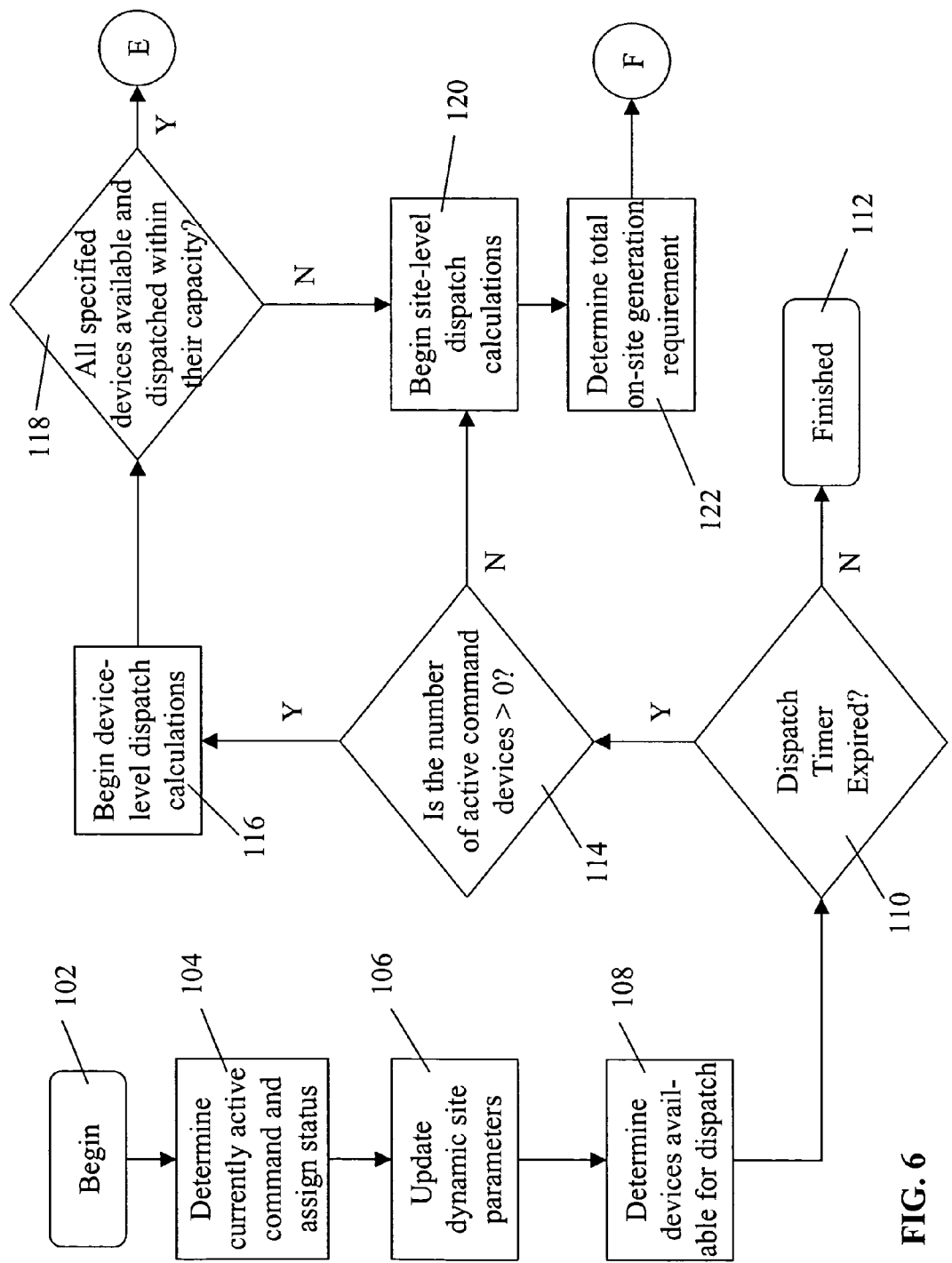
FIGS. 6 through 8 show a flow chart of one embodiment of a site controller dispatch algorithm of the present invention.
Figure 7:
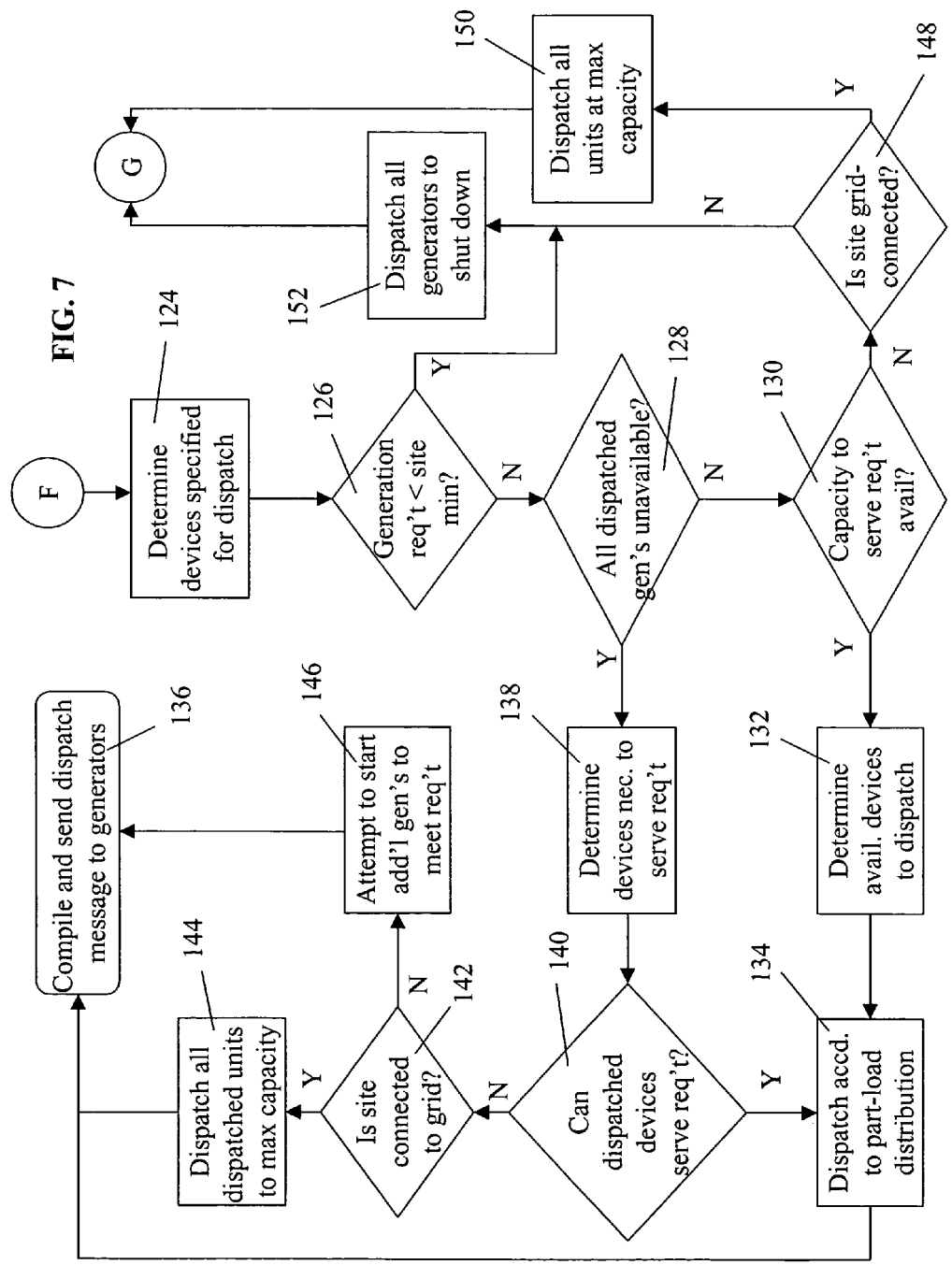
Figure 8:
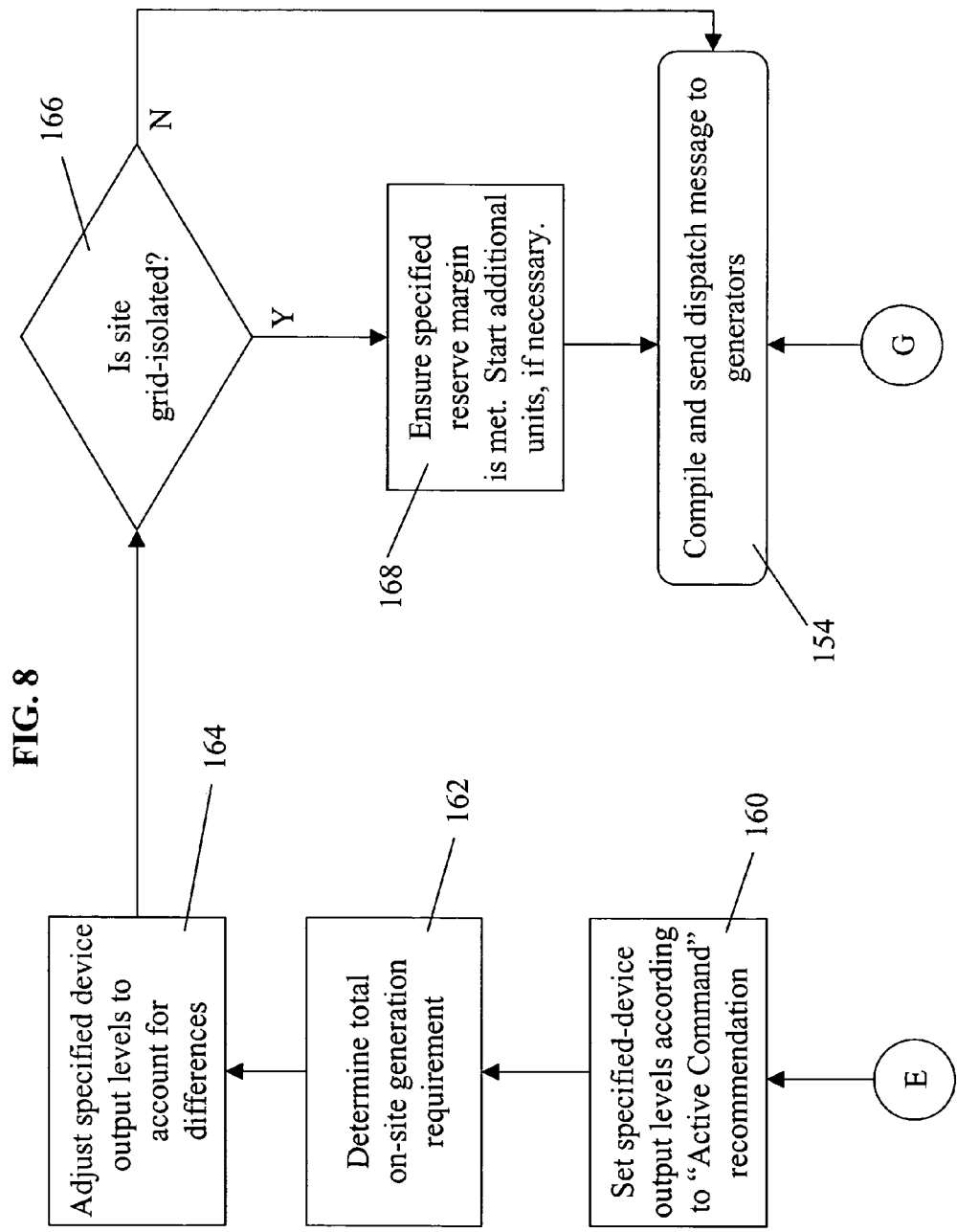

A functional block diagram of one embodiment of the site controller dispatch algorithm is shown in FIGS. 6 through 8. Upon beginning as at 102, the site algorithm determines which pending command from the SOC (41 in FIG. 1) is currently active and assigns it "Active Command" status as at 104. As at 106, the algorithm updates the "site status" data structure which stores dynamic site parameters. As at 108, the algorithm determines which devices on site are available for dispatch. A determination of whether the dispatch timer has expired during this time is made as at 110. If it has not, the algorithm is finished until being run again, as at 112. If the dispatch timer has expired, a determination is made as to whether the "Active Command" number of device records is greater than zero, as at 114. If not, the algorithm begins site-level dispatch determinations as at 120, and such determinations are described elsewhere herein. If the "Active Command" number of device records is determined to be greater than zero, the algorithm begins device-level dispatch determinations as at 116.

Upon making the device-level dispatch determinations at 116, the algorithm determines if all specified devices are available AND dispatched within their capacity as at 118. If not, the algorithm continues to step 120 to begin site-level dispatch determinations, and then proceeds to determine total on-site generation requirements as at 122.

If all specified devices are available AND dispatched within their capacity, the algorithm proceeds to set specified-device output levels according to the Active Command recommendation as at 160 in FIG. 8. Then, the algorithm determines the total on-site generation requirement (called "Device Demand") based on the Active Command operational mode, setpoint and real-time site conditions as at 162. The algorithm then adjusts specified device output levels to make up the difference between the Device Demand and Active Command predicted demand as at 164. At this point, a determination is made as to whether the site is grid isolated, as at 166. If not, as at 154, the algorithm compiles and sends the dispatch message to generators based on each of their particular control interfaces as described above. If so, the algorithm ensures Active Command-specified reserve margin is met and starts additional units if necessary as at 168. Then, the system proceeds to compile and send the dispatch message to the generators as at 154.

Following letter F from FIG. 6 to FIG. 7, once the total on-site generation requirement is determined at step 122 in FIG. 6, the system determines which devices (if any) have been specified for dispatch as at 124. As at 126, a determination is made as to whether Device Demand is less than the site's minimum generation (i.e., the sum of available device's minimum outputs). If so, the dispatch is sent to all generators to shut down as at 152, and this dispatch message follows through point G in FIG. 7 to FIG. 8 whereby step 154 is taken as described above. If not, the determination is made as at 128 as to whether the number of dispatched generators is greater than zero AND all dispatched generators are unavailable. If not, a further determination is made as at 130 as to whether the system has the capacity to serve the Device Demand available. If not, the system makes the determination as to whether the site is grid connected as at 148. If it is not, the system proceeds to dispatch all generators to shut down as at 152 and proceeds onward to step 154 as described. If the system is determined to be grid connected, the system then dispatches all units for operation at maximum (derated) capacity as at 150, and then compiles and send dispatch messages to each unit accordingly as described in step 154.

If the number of dispatched generators is determined to be greater than zero AND any dispatched generators are unavailable, then the system determines which, if not all, available devices are necessary to serve Device Demand as at 138: At this point, the system determines as at 140 whether the dispatched devices can serve the Device Demand and if so, the system dispatches devices according to their part-load distribution as at 134. Returning to step 130, if the system has capacity available to serve the device demand, the system then determines which of the available devices to dispatch, starting with the lowest-capacity unit as at 132. From this point, the system dispatches the devices according to part-load distribution as at 134 as described above. Returning to 138, if the system determines that the available dispatched devices cannot serve the Device Demand, then the system further determines at 142 whether the site is grid connected. If not, then the system attempts as at 146 to start additional generators to meet Device Demand, and then compiles and sends dispatch messages to generators based on each of their particular control interfaces, as at 136. If the site is determined to be grid connected at step 142, then the system proceeds to dispatch all available dispatched-units to maximum (derated) capacity as at 146 and then compiles and sends dispatch messages as at 13.6.

In cases where there are substantial differences between the actual load conditions measured on site and the forecasted load, the site controller component will recognize the issue and notify the system operation center (SOC) by sending a redetermination signal, for example. Based on the notice from the site controller component, the SOC will re-run the SOC programming (i.e., algorithm) to determine a dispatch scheme that is more appropriate for the actual load conditions.

Case Based Reasoning Module

Figure 15:
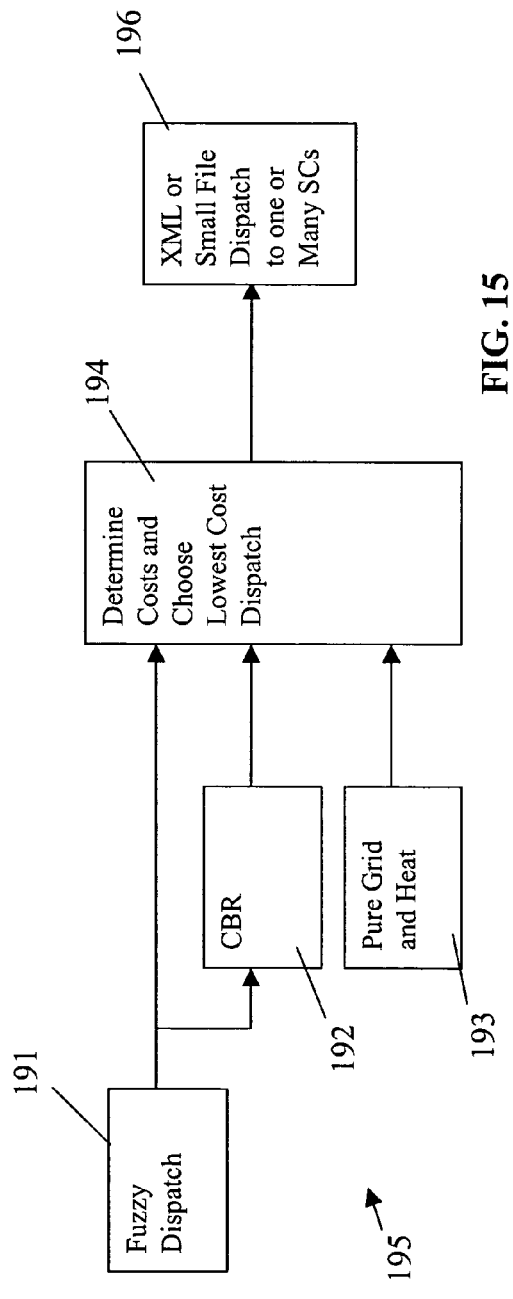
FIG. 15 is a flow chart in accordance with one aspect of the present invention.
Figure 17B:
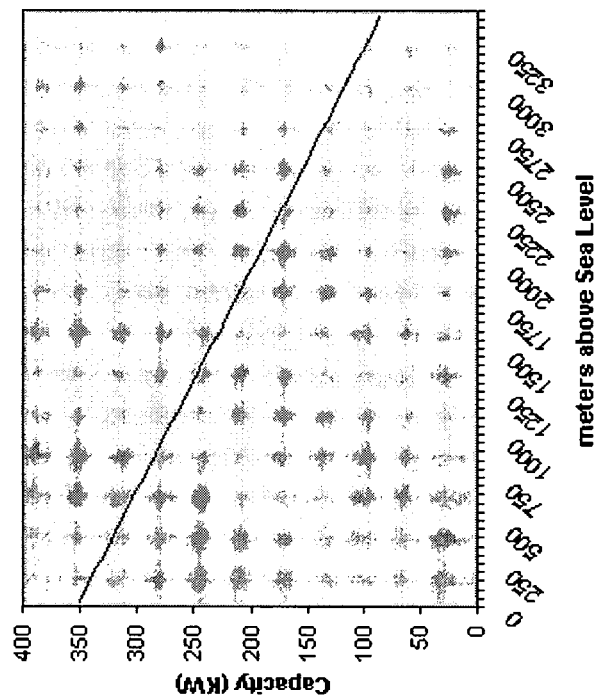
FIGS. 17A through 17D are sample graphs associated with a capacity de-rating parameter of the present invention.
Figure 17A:
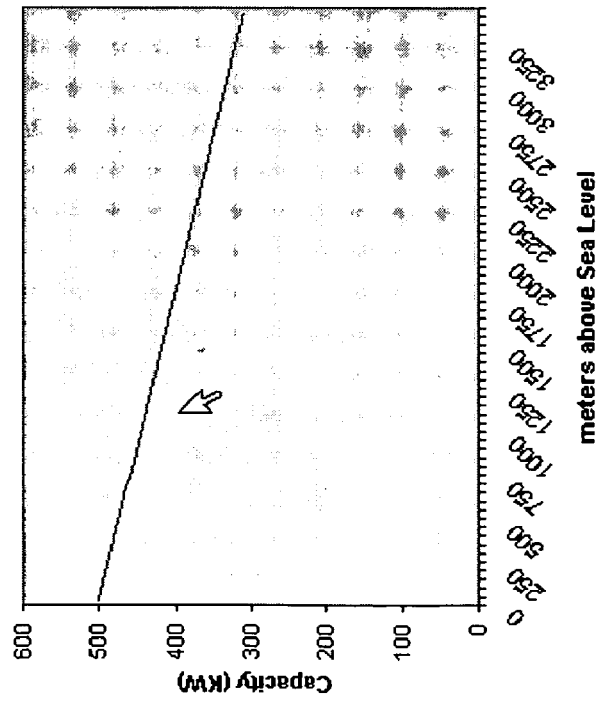
Figure 17D:
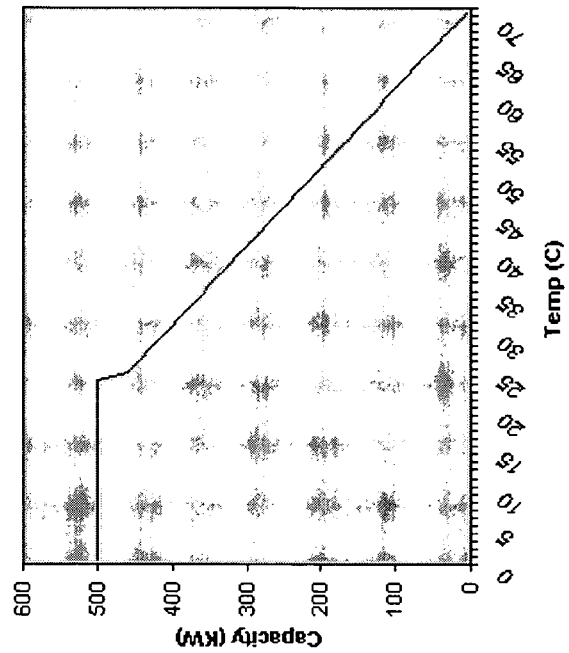
Figure 17C:
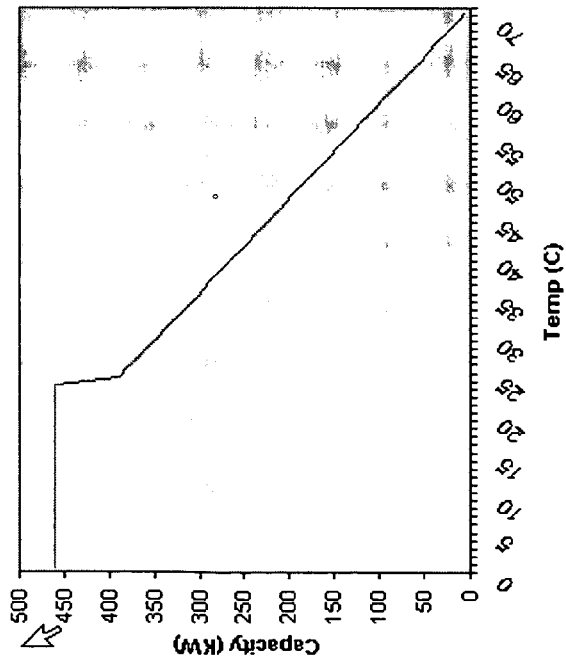

As shown in the diagram 195 in FIG. 15, after the fuzzy logic dispatch is complete as at 191, the results are sent to a case-based reasoning (CBR) module 192 to look for particular cases with which the fuzzy dispatch is known to have trouble. A new dispatch option may or may not result from the CBR module 192. These two dispatch sets will then be compared against each other and a third option, which may be a pure grid and heating unit dispatch 193 (when the site is grid connected), for example. The total cost of each dispatch will then be determined as at 194 and the lowest cost scenario will be chosen using the present invention. The dispatch can be by XML or small file dispatch to the appropriate site controller(s), as at 196.

As an example, a fuzzy logic determination may question whether "grid price is greater than all of the units." A scenario may be whether the site is grid-connected or grid-isolated. The case-based reasoning module may determine to propose dispatching some, all or none of the units based on the input from the fuzzy logic determination. Viewed in a case style, such a determination may appear as follows:

If (grid price is greater than all of the units) and (grid is connected), then propose dispatching all of the units.

The present invention allows for cases to be easily added as they are developed.

The XML file generated by the algorithm can be delivered to the appropriate site controllers based on the information included in the MSMQ wrapper. The XML file may be sent to multiple site controllers at a site. This will allow these multiple site controllers on site to act redundantly.

The configuration of the site controller is an integral part of its operation. The site controller relies heavily on the static parameters that are present in the configuration structures both on the site and device levels. In one embodiment, the site controller can be configured using a XML file called "UPCSC_config.xml" that resides in the application's root directory.

The format of the file is can be seen with this example:

```
<?xml version="1.0" ?>
<config version="3.0" configspecdate="Thu Dec 11 11:34:25 2003">
  <site>
    <site_name>SiteName</site_name>
    <monitor_pt_xsfer_period>15</monitor_pt_xsfer_period>
    <command_query_period>15</command_query_period>
    <broadband_connection>1</broadband_connection>
    <broadband_routing_gateway>192.168.0.1</broadband_routing_gateway>
    <dialup_connection>0</dialup_connection>
    <command_get_node_id>0</command_get_node_id>
    <soc_ipv4_xmlwebserver>http://65.203.73.93</soc_ipv4_xmlwebserver>
    <redetermine_flag_alias>SiteName.RcFl</redetermine_flag_alias>
    <dispatch_units>0</dispatch_units>
    <dispatch_mode>1</dispatch_mode>
    <default_operational_mode>BASE_LOAD</default_operational_mode>
    <default_operational_setpt>0.00</default_operational_setpt>
    <grid_connection_mode>PARALLEL</grid_connection_mode>
    <peak_shave_thresh_adj>0</peak_shave_thresh_adj>
    <peak_shave_thresh_adj_percent>0</peak_shave_thresh_adj_percent>
    <altitude>0</altitude>
    <nominal_voltage>480</nominal_voltage>
    <number_site_controllers>1</number_site_controllers>
    <default_master_controller>0</default_master_controller>
    <number_of generators>1</number_of generators>
    <number_of_pwrmeters>0</number_of_pwrmeters>
    <number_of_iomodules>0</number_of_iomodules>
    <number_of monitor_devs>0</number_of monitor_devs>
  </site>
  <network>
    <broadband_settings ip_address="192.168.0.10" subnet_mask="255.255.255.0" gateway_ip="192.168.0.1"/>
  </network>
  <devices>
    <generator device_id="0" device_name="DIMAG_0210-1" device_type="DIMAG_0210" minimum_out="0" maximum_out="210" classification="BASE_LOAD_UNIT" opt_ramp_rate="0.0">
      *
      *
      *
    </generator>
  </devices>
</config>
```

The first section contains static parameters of the site itself. Then, for each device, static parameters and a data points list are present. The data points list is utilized by both the UPC and site controller during configuration. It tells the site controller which points are going to need to be sent back to SOC for monitoring and also what the scale factor, offset, minimum value, maximum value, and report by exception requirement are on a point if applicable. The list tells the UPC the MODBUS addresses of each point and the size of the data that the point contains.

| # | Data | Description |
|---|------|-------------|
| | | Site Configuration: |
| 1 | Site Name | String |

-continued

| # | Data | Description |
|---|---|---|
| 2 | Default Operational Mode | Enumerated constant |
| 3 | Optimal Control Mode | Boolean (yes/no) |
| 4 | Grid Connection Mode | Enumerated constant |
| 5 | Installation altitude | For use in derating determinations |
| 6 | Command Query Period | How often to check for new dispatch commands |
| 7 | Maximum capacity | Determined from unit list above |
| 8 | Nominal system voltage | e.g. 120 V, 480 V. For detecting abnormalities. |
| 9 | Number of controllers | For use by the Monitoring Module |
| 10 | Default master controller | Numeric identifier for the initial master |
| 11 | Peak Shaving Parameters | Defines behavior in peak-shave operational mode |
| 12 | Dispatch Enable | Boolean (enable/disable) |
| 13 | Dispatch Mode | Full dispatch, Start/Stop Only |
| Unit Configuration: | | |
| 1 | Unit Designation | Used for identifying units from SOC |
| 2 | Unit type | E.G. ENT400 |
| 3 | Unit minimum output | Lowest allowed output level |
| 4 | Unit maximum output | Nominal output level of device (before derating) |
| 5 | Classification | Either "base load" or "load following" |
| 6 | Optimum ramp time | Ramp up and down times under load for optimum unit life |

FIGS. 18 through 22 illustrate sample user interfaces for site and device configuration and monitoring.

Figure 18:
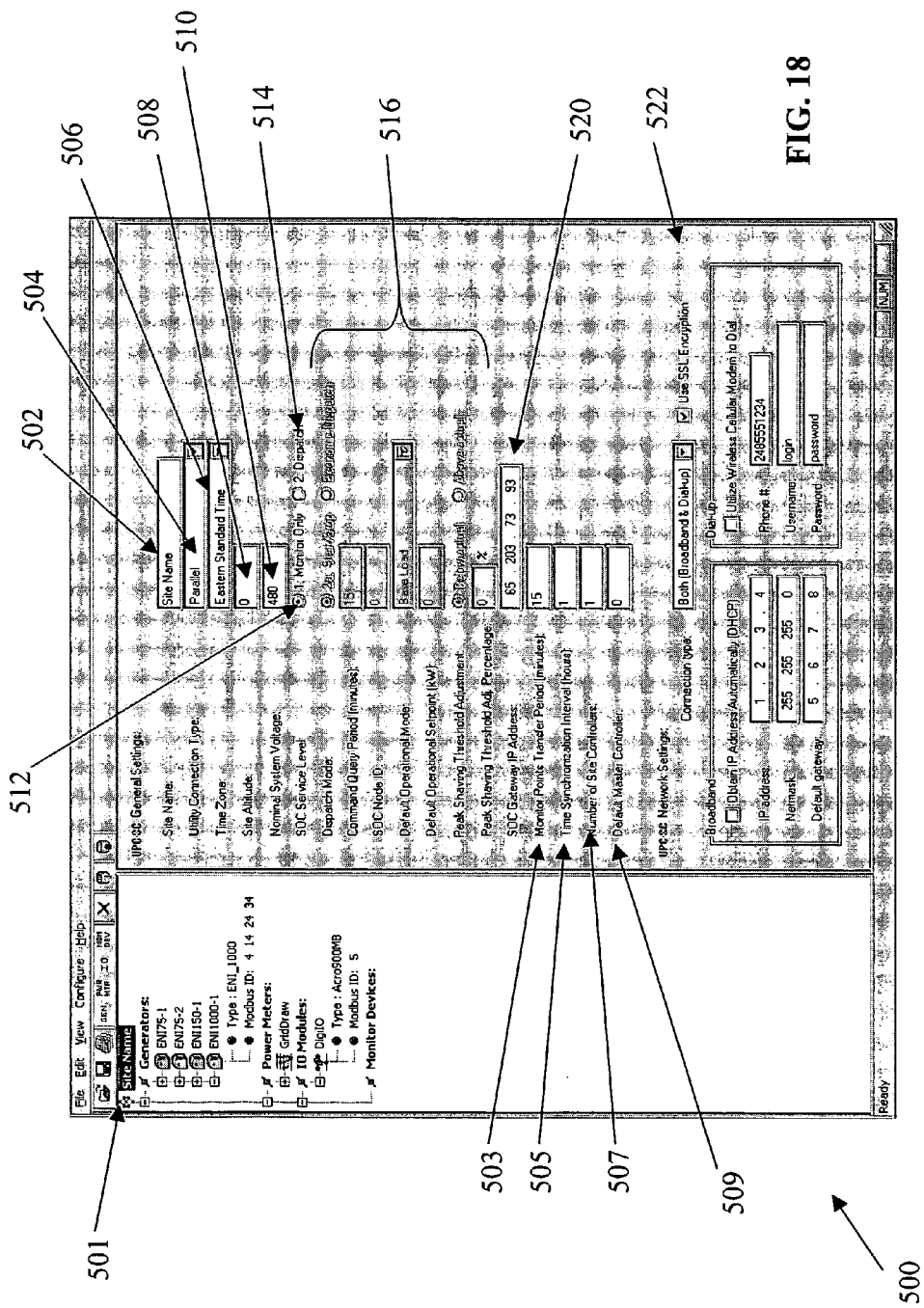

As shown in FIG. 18, the configuration tool user interface 500 allows the user to configure a DG site 501 for operation. Basic information such as the site name 502, utility connection type 504 and time zone 506 can be entered/selected, as well as the site altitude 508, nominal system voltage 510, monitor points transfer period 503, time synchronization interval 505, number of site controllers 507 and master controller identification 509. The System Operation Center service level can be selected as either a "monitor only" mode 512 or "dispatch" mode 514. If dispatch mode is selected, then additional configuration settings 516 become active as shown in FIG. 18 and as described herein. An IP address can be specified as at 520, as well as various network settings 522 depending on the connection present.

Figure 19:
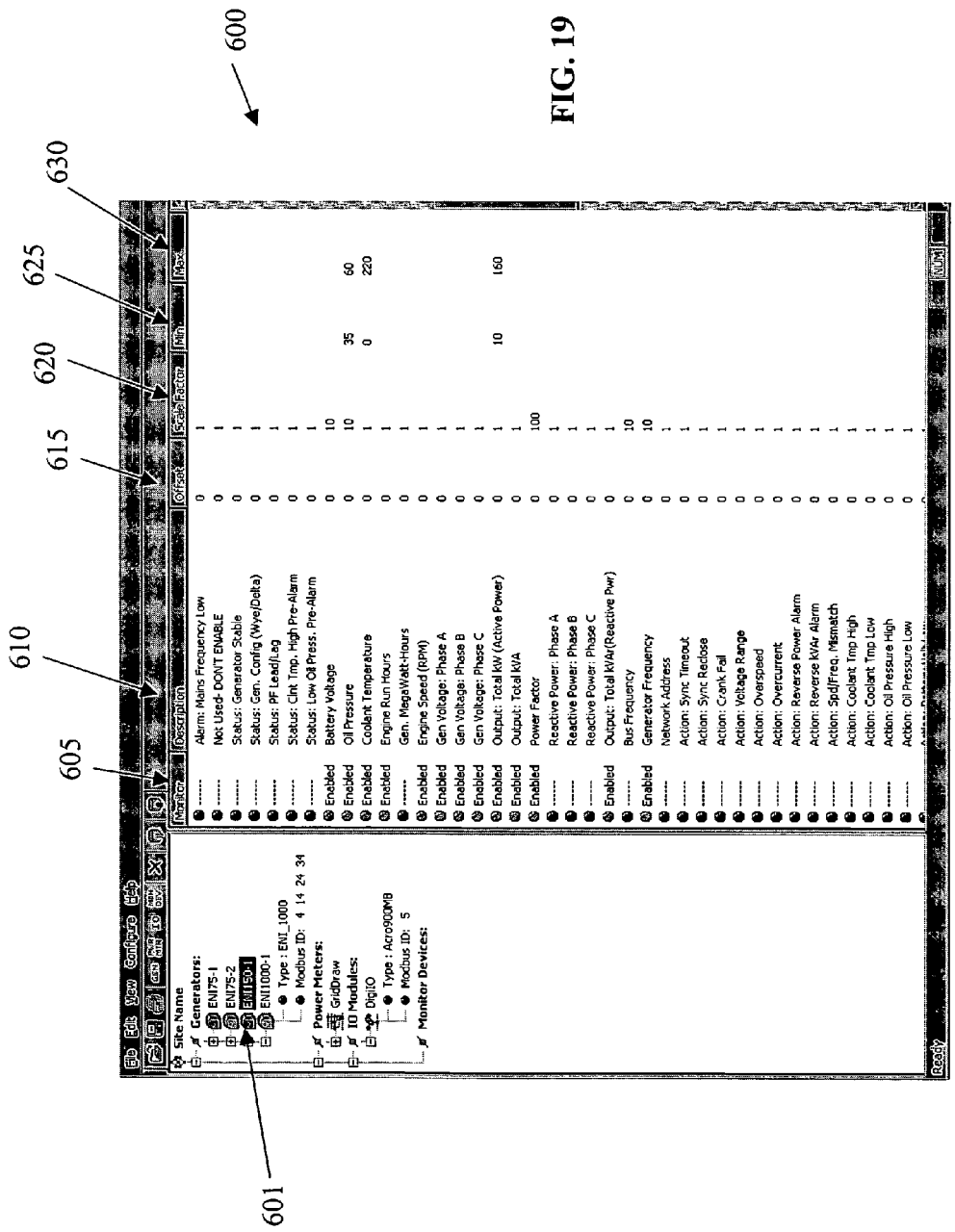

As shown in FIG. 19, configuration tool user interface 600 allows the user to configure a specific device 601 within a DG site configuration. It will be appreciated that interfaces 500 and 600 can be provided on user computer 30 or 40 shown in FIG. 1. User computer 40 can be a configuration computer local to the site controller 25. Various columns and symbols can be provided in interface 600 to allow the user to customize the device configuration. For example, a "monitor" column 605 allows the user to enable or disable various sensors or device monitoring points, as described in the "description" column 610. Other columns shown include the "offset" column 615, the "scale factor" column 620, and minimum 625 and maximum 630 setting columns, for use as appropriate for the give monitoring point.

Figure 20:
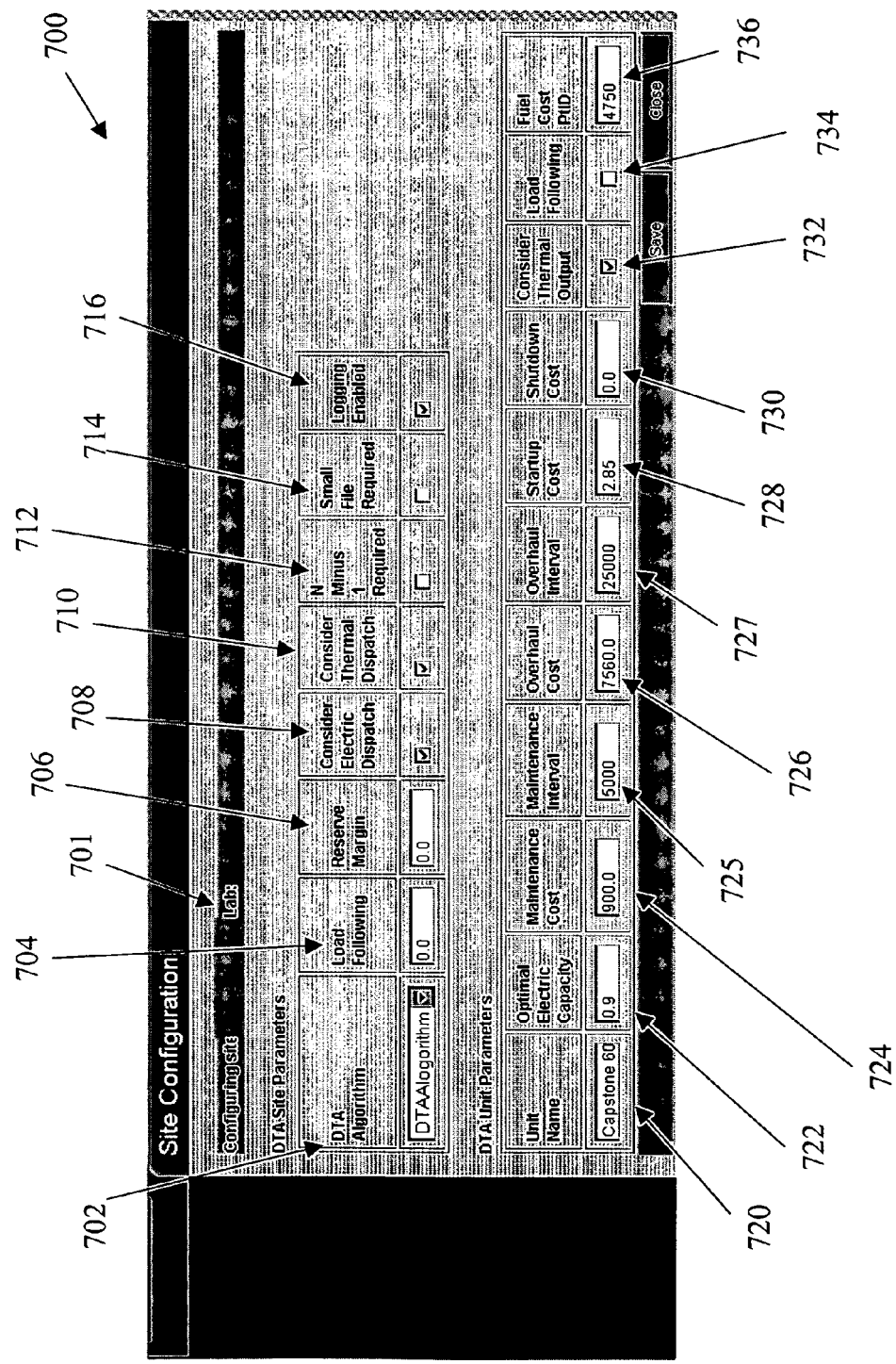
Figure 22:
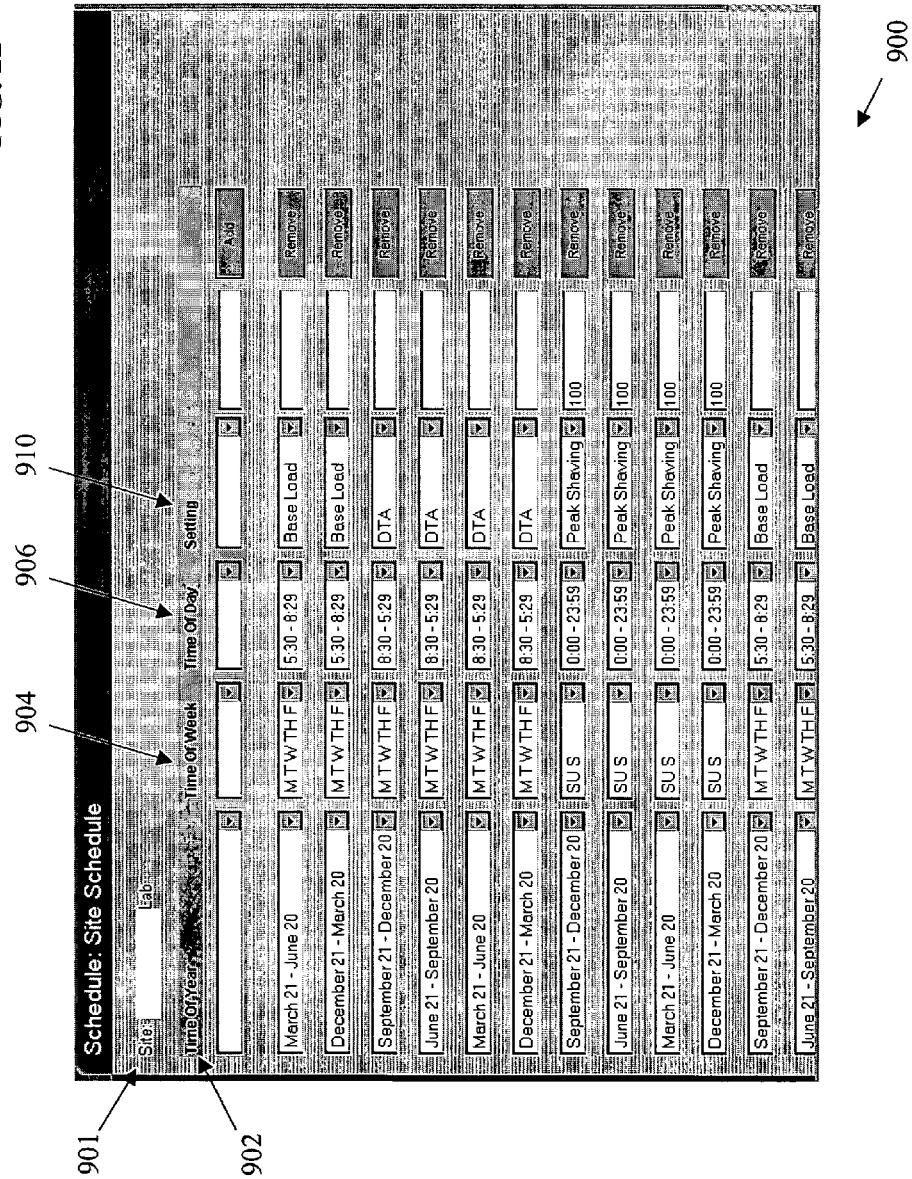

A server side site configuration interface 700 is shown in FIG. 20. As shown in interface 700, the user can configure a specific site 701 according to an algorithm 702 selected for use with the present invention. Particular settings associated with the algorithm can also be specified and/or selected. For example, a load following number 704 and a reserve margin number 706 can be entered. Also, electric 708 and thermal 710 dispatch can be selected or de-selected, as can the "n–1" requirement 712, small file requirement 714 and logging 716. With regard to unit parameter setting, the interface 700 also allows for specification of the unit name 720, unit optimal electric capacity 722, maintenance cost 724, maintenance interval 725, overhaul cost 726, overhaul interval 727, startup cost 728, shutdown cost 730, and fuel cost 736. Additionally, thermal output 732 and load following 734 can be selected or de-selected via interface 700.

Figure 21:
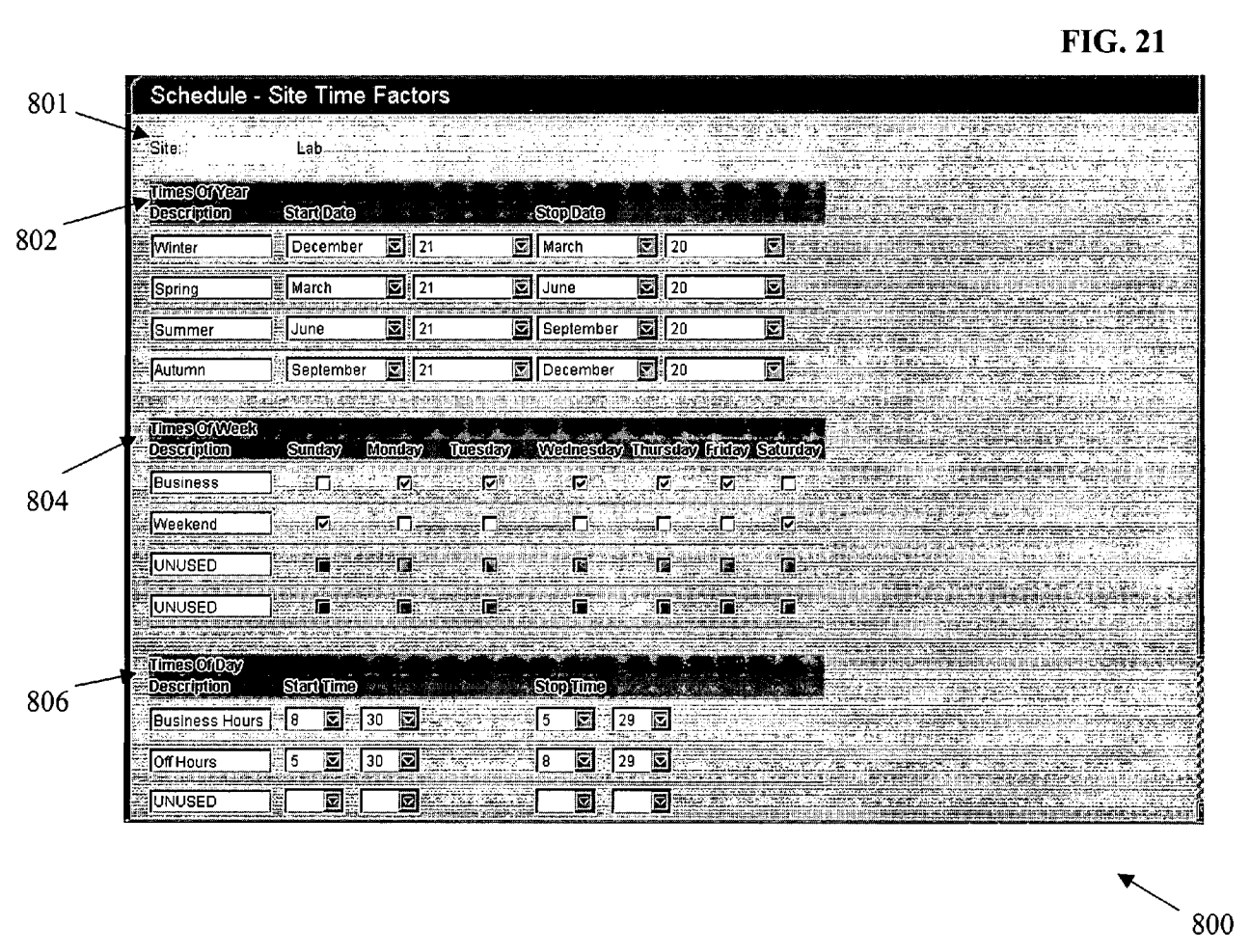

A server side scheduling configuration interface 800 is shown in FIG. 21. As shown therein, site time factors can be specified for a given site 801 according to times of the year 802, times of the week 804 and times of the day 806. As shown in scheduling configuration interface 900 in FIG. 22, a site schedule can also be designated for a specified site 901 in conjunction with the site time factors of FIG. 21. For example, once the time of year 902, time of week 904 and time of day 906 settings are specified, the desired operational mode or setting can be selected as shown in column 910. In this way, the system can have an operational mode established for all times during the year. Such settings can be monitored and/or changed as desired to reflect real-time operational needs.

Example operational modes to be specified in column 910 can include "baseload", "economic dispatch" mode (also known as "DTA" (DTECH algorithm)), "peak shaving", "economic dispatch with peak shaving", and "single point" control.

The baseload operational mode defines at what constant output to run each device on site. The scheduling software prompts the user for the kilowatt (kW) level at which each piece of generation equipment is to be run during the scheduled period of time. This can include any kW value up to the maximum generation capacity of the device and as low as zero (indicating the unit should be shut down).

For the economic dispatch (DTA) operational mode, there is no associated setpoint. When economic dispatch is specified during a scheduled period of time, the server-side algorithm will compute the optimal operating scheme for the site every hour during the configured time period and send the recommendation to the site's site controller/UPC. The server-side algorithm is described in depth throughout this specification.

The "peak shaving" operational mode runs at the site level and thus does not require any device-specific directives. However, this operational mode does require a site-level kilowatt setpoint, called the threshold. The peak shaving threshold defines when the site's UPC/SC is to begin dispatching the available generation assets to serve the electric load. The UPC/SC receives a peak shaving command from the server-side at the beginning of the scheduled time period. During the scheduled time period, the UPC/SC then monitors the amount of electricity drawn from the grid. When the grid-draw approaches the peak-shaving threshold, the UPC/SC dispatches generation assets to prevent the amount of grid-draw from exceeding the specified threshold. Once the site electric load has fallen below the threshold, the UPC/SC shuts down the generator(s) and allows electricity to once again be drawn entirely from the grid. Logic exists within the UPC/SC to prevent generation assets from repeatedly starting and stopping when the grid draw hovers near the threshold.

The economic dispatch with peak shaving operational mode requires a site-level kilowatt setpoint, called the threshold, which defines when the site will switch from economic dispatch to peak shaving. Like economic dispatch, hourly commands are sent to the site during the scheduled time period. These commands define recommendations for optimal operation of the site's generation assets. However in addition to these recommendations, the peak shaving threshold is also specified. During the scheduled time period, the UPC/SC monitors the amount of electricity drawn from the grid and when the grid-draw approaches the peak-shaving threshold, the UPC/SC dispatches additional generation assets to prevent the amount of grid-draw from exceeding the specified threshold. Once the site electric load has lowered such that the threshold is no longer in danger of being exceeded, the UPC/SC resumes dispatching the site according to the economic dispatch recommendations.

Single point control allows for start and stop commands to be sent to a generator.

Small File Version

In addition to the XML file that will be sent to the site controller, a "small file version" of this XML Document can optionally be sent, the two options constituting a mutually exclusive set. This file will likely be a comma separated or fixed-width file sent for the purpose of reducing network load.

Example SOC Command File (Small File Format)

```
!H: V1.0;
   T0;
   ID2
!T: ST2002-03-08T02:33:08;
   UD1440
!S: OM(14)1;
   GE(10)1;
   RM(18)6;
   HL(11)1200;
   LL(12)120;
   OS(16)0;
   SS(19)1;
   DS(8)NONE
!D:
   [1]: OM(26)1
   [2]: AO(32)150;
      RO(38)15
!A: AD1;
   OM13;
   GE9;
   RM17;
   OS15
!
```

In one embodiment, "small file" format details can include:
  i. The items written in bold-italic represent either integers or floating point values that are in their actual 16 or 32 bit representations in the file.
  ii. All data fields follow XML schema. However, the names have been shortened to two characters each by stripping the first (and last in the case of control points) For example: In the site record, 'SOMC' is now 'OM' or in the time record: 'CST' is now 'ST'.
  iii. "Namespaces" begin with an '!' and the first letter of the section type: 'H' for header, 'T' for Time record, 'S' for Site record, 'D' for Device record, and 'A' for Acknowledgement record.
  iv. The values in parenthesis in the "Site" and "Device" records are data point ID numbers; the values in brackets (device record only) are the one-based device index number.
  v. No numeric values are passed as ASCII characters (requiring 8-bits each). The only exception to this is the "start-time", which remains a string.
  vi. None of the whitespaces or carriage returns are present in the actual file; they are only present here for clarity.

The raw file is terminated with an ASCII question mark.

The small file format can reduce the chance development of network bottlenecks created by the frequent messages being sent to the sites.

Example Operation

In a specific embodiment of the present invention, the economics of running DGE units is based on the load served, fuel costs, part load efficiencies, competing electric service prices, maintenance costs, unit availability, and meeting reserved margin requirements. The preliminary algorithms use forecasted data to determine the optimal economic operating point are run on servers 42, 44, 46 at the System Operation Center (SOC) 41. The local controls, including the site controller component 25, adjust the suggested commands from the SOC based on actual load conditions using site controller algorithm component 250.

Data Generated by SOC

In this embodiment, the SOC algorithms are based on whether the site being controlled is isolated or connected from the traditional grid. It will be appreciated that stand-alone operation is the operation of a single unit powering a dedicated power system with or without grid standby. In stand-alone operation, the unit never operates parallel with the grid.

An example approach for determining appropriate commands for each of these modes (grid isolated/grid connected) is listed below:

Grid Isolated
1. Maintain the available capacity such that if any one unit fails, the forecasted connected load will still be met.
2. Determine a reserve margin based on the forecasted load and set the available capacity accordingly.
3. Determine the optimal economic operating point for one day with fifteen-minute resolution based on the following: fuel cost, load management options, part load efficiency curves and unit availability.
4. Re-determine the optimal economic point every fifteen minutes and adjust the site parameters if the economic situation (fuel cost, unit availability, etc.) has changed substantially.
5. Once per hour read actual loads at a given site and adjust the recommended load settings accordingly (load forecast adjustment).
6. Equalize the operations hours of the available units.
7. Accept part load efficiency data from the site and adjust the part load efficiency curves accordingly.
8. Minimize maintenance costs.
9. Adjust for the de-rating of the units based on ambient temperature (temperature forecasting will be required and adjustments will need to be sent to the units when forecasted temperatures differ greatly from the forecasted ones).
10. Adjust for the de-rating of units for failed components. If the unit informs SOC that a component has failed and the output has to be de-rated, SOC will need to re-determine the optimal states and re-send them.

Grid Connected
1. There is no requirement for maintaining the load if one unit fails. The electric grid will make up the difference. The exception to this rule is if the site capacity is contracted for export. In this case, the grid allowance variable, defined below, should be set to false, and the contracted capacity should be added to the forecasted load.

2. Set reserve margins to zero if not exporting.
3. Determine the optimal economic operating point for one day with fifteen-minute resolution based on the following: fuel cost, load management options, part load efficiency curves and unit availability.
4. Re-determine the optimal economic point every fifteen minutes and adjust the site parameters if the economic situation (e.g., fuel cost, unit availability, etc.) has changed substantially.
5. Once per hour, read actual loads at a given site and adjust the recommended load settings accordingly (load forecast adjustment).
6. Equalize the operations hours of the available units.
7. Accept part load efficiency data from the site and adjust the part load efficiency curves accordingly.
8. If electric grid prices are expected to be high, or if the site's capacity has been contracted for export, set the grid-allowance variable to false. This effectively tells the site to not allow for any purchase off the grid.
9. Minimize maintenance costs.
10. Adjust for the de-rating of the units based on ambient temperature (temperature forecasting will be required and adjustments may need to be sent to the units when forecasted temperatures differ greatly from the forecasted ones).
11. Adjust for the de-rating of units for failed components. If the unit informs SOC that a component has failed and the output has to be de-rated, SOC will need to re-determine the optimal states and re-send them.

The result of these SOC algorithms will determine the optimal power output for the units. In one embodiment, the recommended loads can be transferred to the sites once per day and can specify the output on a fifteen-minute interval. An example of the required data for a given site can include (1) the date, (2) the unit number, (3) the time, (4) the part load, (5) reserve margin and (6) grid allowance.

In one embodiment, for each unit, this site data can contain one day's part loads at fifteen-minute resolution (96 records per unit). In the case of extreme changes in economic conditions (e.g., increase in grid prices, loss of unit, fuel prices, etc.), the SOC may update the site data more often than once per day. This data may be updated on up to a fifteen-minute basis, in one embodiment.

The grid allowance variable is intended to notify the local controls about the conditions expected for the connected grid. This variable will be set to false if the grid prices are expected to be high. In this case, the local controls should manage their output to minimize the power used from the microgrid or DG deployment.

The present invention sends the final recommendations from the SOC, and the site controller determines whether the recommendations should be overridden based on actual load conditions. An example operation for the site based on the two modes (grid isolated, grid connected) are listed below:

Grid Isolated

This mode of operation is entered when either the DG units are not connected to an electric grid or the "grid allowance" Boolean variable has been set to false. In this case, the units will use the SOC suggestions to determine the start-up sequence for the units, but will deviate from the recommendations to maintain voltage and frequency to the connected load. The example requirements for the local control systems are listed below:

1. Maintain voltage and frequency independent of SOC recommendations.
2. Maintain SOC recommend reserve margin based on actual load.
3. Maintain the available capacity such that if one operating unit fails, the connected load can still be served by the remaining available capacity.
4. Adjust for start time of units. For example, if it takes 10 minutes for a unit to start and its controls see that SOC has recommended that it start in 10 minutes and be running at 70% capacity, then the unit's controls should start the units start-up sequence 10 minutes ahead of the recommendation.
5. Send part load efficiency values back to SOC.
6. Adjust for the de-rating of the units based on ambient temperature (ambient temperature being measured, adjusted for and sent back to SOC).
7. Adjust for the de-rating of units for failed components. The units must also inform SOC of these failures and repairs.
8. Adjust for the difference between the SOC recommendation and the actual load proportionally based on the total available capacity and the individual unit ratings. For example, if two units rated at 400 kW are each running at 300 kW and another unit rated at 70 kW is running at 50 kW, which is based on a forecasted load of 650 kW, and the actual load is 700 kW, then the generation can be modified based on the following:

$$400 \text{ kW units: } (700-650) \times 400/(2 \times 400+70) = 23 \text{ kW}$$

$$70 \text{ kW unit: } (700-650) \times 70/(2 \times 400+70) = 4 \text{ kW}$$

Thus, in this example, the two 400 kW units that were running at 300 kW should be boosted to 322 kW, and the 70 kW unit that was running at 50 kW should be boosted to 54 kW.

A similar algorithm can be used to determine the kVAR output of each machine.

Grid Connected

This mode of operation is entered when the units are connected to an electric grid and the grid allowance variable is set to true. In an example of this case, the units can allow up to a 10% deviation from the SOC suggestions without modifying the units output. If the load increases above 10%, the unit can share the additional load proportionally as described previously. The example requirements for the local control systems are listed below:

1. Maintain voltage and frequency independent of SOC recommendations.
2. Set no reserve margin requirement for this case.
3. There is no one unit failure requirement in this case.
4. Adjust for start time of units.
5. Adjust for the de-rating of the units based on ambient temperature (ambient temperature being measured, adjusted for and sent back to SOC).
6. Adjust for the de-rating of units for failed components. The units must also inform SOC of these failures and repairs.
7. Adjust for the difference between the SOC recommendation and the actual load proportionally.
8. In grid connected mode, the units will operate at unity power factor.

With regard to data transfer, the master control unit will use the SOC recommendations to transfer real, reactive and zero sequence outputs for each machine on site. This data will need to be updated for each machine at least 500 times per second. Considering a maximum of four machines per site and 16 bits per data point, the data transfer rate is (3 machines)×(3 data points)×(16 bits)×(500 Hz)=72 kbps of payload. Considering a ten times factor, for the data overhead (addressing, CRC, etc.), the required bandwidth is 720 kbps.

In one embodiment, if the connection to SOC is lost or the part load efficiency data is not updated within a given time period (e.g., 24 hours), the local control can be programmed to continue to use the last set of data sent from the SOC as the operating starting point.

In one implementation, one unit on site will be designated the master controller, and all others will be slaves. Each unit will be capable of operating as the master controller in case the master controller fails. The units will be indexed on site starting at one. Unit one will be the master controller typically. In the event that unit one fails, unit two will take over the responsibilities of the master controller. Unit two will take over this responsibility when it determines that unit one has failed by monitoring a count that is updated through the external network by the master controller. All units will monitor this count. If the count is not updated within 10 seconds, for example, unit two will notify the other units on the network that it is now the master controller. If within 10 seconds after the original 10 seconds the count is not updated, then unit 3 will take over the master control functionality. The master controller will be responsible for monitoring the actual connected load and determining the adjustments to the outputs according to the above listed requirements.

By way of example, consider a grid isolated site with a peak annual load of 1200 kW and a minimum load of 700 kW. Eleven units are serving the site as listed below:

Unit 1: 400 kW with 300 hrs. and expected failure rate of 2 yrs.

Unit 2: 400 kW with 250 hrs. and expected failure rate of 3 yrs.

Unit 3: 400 kW with 250 hrs and expected failure rate of 2 yrs.

Unit 4: 400 kW with 200 hrs and expected failure rate of 2 yrs.

Unit 5: 200 kW with 100 hrs and expected failure rate of 2 yrs.

Unit 6: 70 kW with 300 hrs and expected failure rate of 2 yrs.

Unit 7: 70 kW with 300 hrs and expected failure rate of 2 yrs.

Unit 8: 70 kW with 350 hrs and expected failure rate of 2 yrs.

Unit 9: 70 kW with 0 hrs. and no failure rate data (SOC will assume 2×4 yrs.=8 yrs.)

Unit 10: 25 kW with 0 hrs. and no failure rate data (SOC will assume 2×4 yrs.=8 yrs.)

Unit 11: 25 kW with 300 hrs and expected failure rate of 2 yrs.

It will be appreciated in this example that, in the case of a new unit, the SOC will determine the failure rate as twice the manufacturer's listed rate due to the "infant mortality" effect.

In this example, the SOC forecasts the load to be 900 kW at 10:00 am and a 40% reserve margin is needed. A high reserve margin is needed due to the fast rate of load change at 10:00 am.

The 40% reserve margin requires that the available capacity must be 900 kW×1.4=1,260 kW.

SOC determines that the following units should be run:

Unit 3—280 kW—unit 1 is not chosen because of the high operational hours and unit 2 is not chosen because of the higher expected rate of failure.

Unit 4—280 kW

Unit 5—145 kW

Unit 6—45 kW

Unit 7—45 kW

Unit 8—45 kW

Unit 9—45 kW

Unit 10—15 kW

Total=900 kW

Available=2×400+200+4×70+25=1305 kW—meets reserve margin requirement of 1260 kW.

If a 400 kW unit fails, the available capacity is 400+200+4×70+25=905 kW—meets one failure requirement (i.e. the available 905 kW is greater than the forecasted 900 kW).

Now consider that, on site, the actual load is found to be 920 kW rather than the forecasted 900 kW. The remaining 20 kW is made up by the local control system proportionally as follows:

Units 2 and 3 pick up 20×400/1305=6.1 kW

Unit 5 picks up 20×200/1305=3.0 kW

Units 6, 7, 8 and 9 pick up 20×70/1305=1.1 kW

Unit 10 picks up 20×25/1305=0.4 kW

In addition, to meet the requirement of allowing one unit to fail and still be able to meet load, the local control system will have unit 11 begin its start up sequence. Unit 11 is chosen in this example because its capacity is closes to the additional 15 kW required to meet the requirement.

The cost savings provided by the present invention are significant, and are dependent on the variability in the considered parameters, e.g., load, price, etc. as described above, as well as the customer's reliability needs.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A method for determining optimal dispatch schemes for an on-site power generation arrangement, said arrangement including at least one generation unit, comprising the steps of:

(a) receiving forecasted electric or thermal load information associated with said on-site power generation arrangement; and (b) determining at least one suitable operating point for said at least one generation unit to serve the forecasted load, said determining step including the step of determining a reliability factor associated with serving said load,
wherein said step of determining a reliability factor includes the step of determining at least a temperature de-rating of said at least one unit, a load following requirement, percentage of output capacity, unit availability, a reserve margin, or a unit running status.

2. The method of claim 1 wherein step (a) includes receiving forecasted electric and thermal load information.

3. The method of claim 1 including the further step of:
(c) determining an optimal economic operating point for said at least one unit in said arrangement, including determining conditions for meeting electric load requirements and levelizing hours of operation.

4. The method of claim 1 wherein said forecasted electric or thermal load information is determined by past load trends and current conditions associated with said arrangement.

5. The method of claim 1 wherein said arrangement includes a plurality of generation units, and wherein said step of determining at least one suitable operating point includes determining at least one suitable operating point for each of said plurality of generation units.

6. The method of claim 5 wherein said step of determining at least one suitable operating point includes the step of determining a plurality of suitable operating points, and wherein said method includes the further step of ranking said suitable operating points for each of said plurality of generation units.

7. The method of claim 1 wherein the step of determining at least one suitable operating point is conducted by a remote controller, and wherein the method includes the further step (c) of providing a local site controller to determine whether to adjust site parameters based on actual load conditions without communicating with the remote controller.

8. In a system for serving local energy needs, said system including an on-site power generation arrangement including at least one power generation unit, said system further including a remote controller for determining at least one operating point for said at least one power generation unit, a site controller for controlling operation of said arrangement, said site controller comprising:
means for receiving remote dispatch commands associated with said arrangement from said remote controller, said remote dispatch commands including at least operating point information for said arrangement, said operating point information being determined by forecasted thermal or electric load information available to said remote controller; and
means for determining appropriate unit-level dispatch commands based on said unit type and further based on site controller-determined real-time site conditions associated with said at least one unit, including at least the unit's output, grid draw, load demand, unit status, and grid connection status.

9. The site controller of claim 8 further comprising:
means for converting generic control data associated with said dispatch commands into unit type-specific control data;
means for converting unit type-specific control data into at least one physical signal based on said unit type communication protocol; and
means for delivering said at least one physical signal to said at least one unit.

10. A method for determining optimal dispatch schemes for an onsite power generation arrangement having at least one power generation unit, comprising the steps of:
determining whether there is a currently active command for said arrangement;
upon there being at least one unit with an active command,
determining a device level dispatch value;
upon all specified devices being available and dispatched within capacity,
setting specified device level output levels to the active command recommendation;
determining the total on-site generation requirement; and
adjusting specified device output levels to accommodate for differences; and
upon said arrangement being grid isolated, ensuring specified reserve margin is met; and
compiling and sending at least one dispatch message to said at least one power generation unit in said arrangement.

11. The method of claim 10 wherein the step of determining whether there is a currently active command for said arrangement is performed by an onsite site controller co-located with the onsite power generation arrangement, and wherein the step of adjusting specified device output levels is also performed by the site controller.

12. A method for determining optimal dispatch schemes for an onsite power generation arrangement having at least one power generation unit, comprising the steps of:
determining whether there is a currently active command for said arrangement;
upon there being no unit with an active command, or upon there being at least one unit with an active command but wherein all specified devices are either not available or not dispatched within capacity,
determining site level values;
determining total on-site generation requirements;
upon said generation requirement being less than the site minimum,
dispatching all units to shut down and compiling and sending said dispatch message to said units;
upon there being at least one available dispatched generator and no capacity to serve the determined requirement,
determining whether the site is grid-connected;
upon being grid-isolated,
dispatching all generation units to shut down;
upon being grid-connected,
dispatching all generation units to operate at maximum capacity; and
compiling and sending at least one dispatch message to a power generation unit;
upon there being at least one available dispatched generator and capacity to serve said determined requirement available,
determining available devices to dispatch;
dispatching according to part-load distribution; and
compiling and sending at least one dispatch message to a power generation unit;
upon all dispatched generation units being unavailable;
determining devices necessary to serve said determined requirement;
upon said dispatched units being determined able to serve said requirement,
dispatching according to part-load distribution; and compiling and sending at least one dispatch message to a power generation unit;

upon dispatched units not units being determined able to serve said requirement,
- determining whether the site is grid connected, and
- upon said site being grid connected,
  - dispatching all dispatched units to operate at max capacity;
- upon said site being grid isolated,
  - attempting to start additional units to meet said requirement; and compiling and sending at least one dispatch message to a power generation unit.

13. The method of claim 12 wherein the step of determining whether there is a currently active command for said arrangement is performed by an onsite site controller co-located with the onsite power generation arrangement, and further wherein the step of determining site level values is performed by the site controller.

* * * * *